United States Patent
Kawaguchi et al.

(10) Patent No.: US 9,386,411 B2
(45) Date of Patent: Jul. 5, 2016

(54) RADIO ACCESS SYSTEM, CONTROLLING APPARATUS, AND TERMINAL APPARATUS

(71) Applicant: FUJITSU LIMITED, Kawasaki-shi, Kanagawa (JP)

(72) Inventors: Takahiro Kawaguchi, Kamakura (JP); Yutaka Hamada, Yokosuka (JP); Hiromitsu Kawai, Yokohama (JP); Katsuyuki Masuda, Yokohama (JP); Yuki Shinada, Saitama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/590,338

(22) Filed: Jan. 6, 2015

(65) Prior Publication Data

US 2015/0237466 A1    Aug. 20, 2015

(30) Foreign Application Priority Data

Feb. 17, 2014   (JP) .................................. 2014-027462

(51) Int. Cl.
*H04W 24/00* (2009.01)
*H04W 4/02* (2009.01)
*H04W 4/08* (2009.01)

(52) U.S. Cl.
CPC . *H04W 4/02* (2013.01); *H04W 4/08* (2013.01)

(58) Field of Classification Search
None
See application file for complete search history.

(56) References Cited

U.S. PATENT DOCUMENTS

| | | | | |
|---|---|---|---|---|
| 2003/0013445 A1* | 1/2003 | Fujiwara | ............... | H04W 60/00 455/435.1 |
| 2005/0113123 A1* | 5/2005 | Torvinen | ............... | H04W 4/021 455/519 |
| 2007/0270139 A1 | 11/2007 | Jendbro et al. | | |

FOREIGN PATENT DOCUMENTS

| | | |
|---|---|---|
| JP | 2009-538019 | 10/2009 |
| JP | 2010-45525 | 2/2010 |
| WO | 2007/135493 | 11/2007 |

* cited by examiner

Primary Examiner — Adolf Dsouza
(74) Attorney, Agent, or Firm — Fujitsu Patent Center

(57) ABSTRACT

A radio access system includes a controlling apparatus that when the terminal apparatuses to which delivery data is to be delivered are concentrated in a particular area, groups the terminal apparatuses as a terminal apparatus group, selects a representative server terminal apparatus from the terminal apparatuses, creates data map information indicating a delivery rule for delivering the delivery data from the representative server terminal apparatus to another terminal apparatus, adds information for identification of the representative server terminal apparatus to the data map information, transmits the group information and the data map information to the terminal apparatuses, and instructs a delivery data server to deliver the delivery data to the representative server terminal apparatus; and a terminal apparatus that obtains the delivery data by communicating, in accordance with the received data map information, with the another terminal apparatus within the terminal apparatus group included in the received group information.

9 Claims, 16 Drawing Sheets

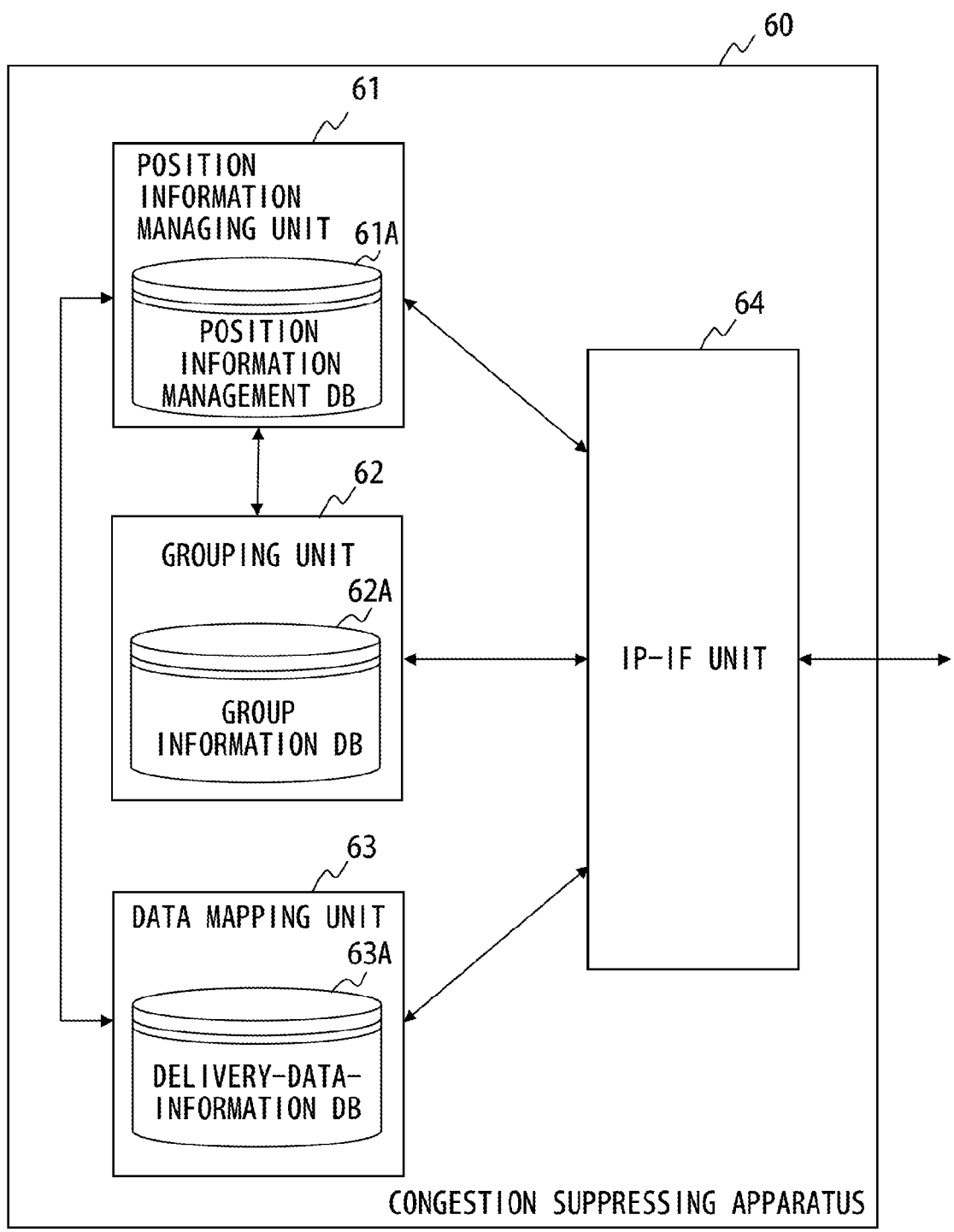
F I G. 2

| AREA NUMBER | TOTAL NUMBER OF TERMINALS | GROUP ID | TERMINAL APPARATUS NUMBER (MAXIMUM: 65535) |
|---|---|---|---|
| 1 | 100 | 1 | 0x0001~0x0064 |
| 2 | 200 | 2 | 0x0001~0x00C8 |
| 3 | 500 | 3 | 0x0001~0x01F4 |
| 4 | 1000 | 4 | 0x0001~0x03E8 |
| 5 | 5000 | 5 | 0x0001~0x1388 |
| 6 | 10000 | 6 | 0x0001~0x2710 |

F I G. 3

| Y ADDRESS \ X ADDRESS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| 1 | 1 | 5 | 9 | 13 | 17 | 21 | 25 | 29 | 33 | 37 | 41 | 45 | 49 | 53 | 57 | 61 | 65 | 69 | 73 | 77 | 81 | 85 | 89 | 93 | 97 | 101 | 105 | 109 | 113 | 117 |
| 2 | 2 | 6 | 10 | 14 | 18 | 22 | 26 | 30 | 34 | 38 | 42 | 46 | 50 | 54 | 58 | 62 | 66 | 70 | 74 | 78 | 82 | 86 | 90 | 94 | 98 | 102 | 106 | 110 | 114 | 118 |
| 3 | 3 | 7 | 11 | 15 | 19 | 23 | 27 | 31 | 35 | 39 | 43 | 47 | 51 | 55 | 59 | 63 | 67 | 71 | 75 | 79 | 83 | 87 | 91 | 95 | 99 | 103 | 107 | 111 | 115 | 119 |
| 4 | 4 | 8 | 12 | 16 | 20 | 24 | 28 | 32 | 36 | 40 | 44 | 48 | 52 | 56 | 60 | 64 | 68 | 72 | 76 | 80 | 84 | 88 | 92 | 96 | 100 | 104 | 108 | 112 | 116 | 120 |

F I G. 4

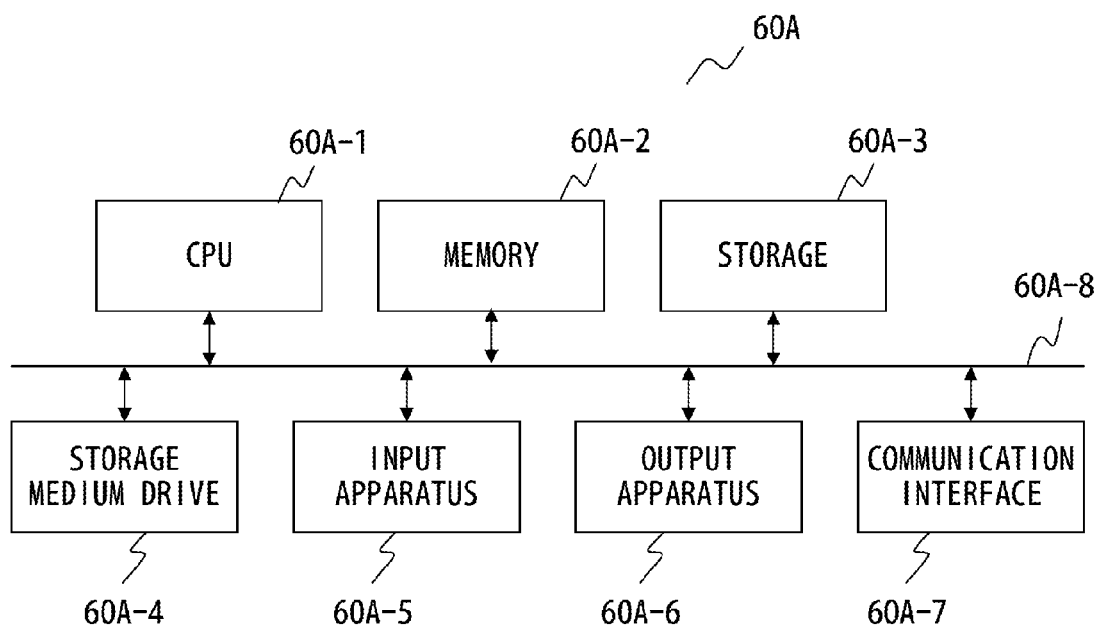
F I G. 5

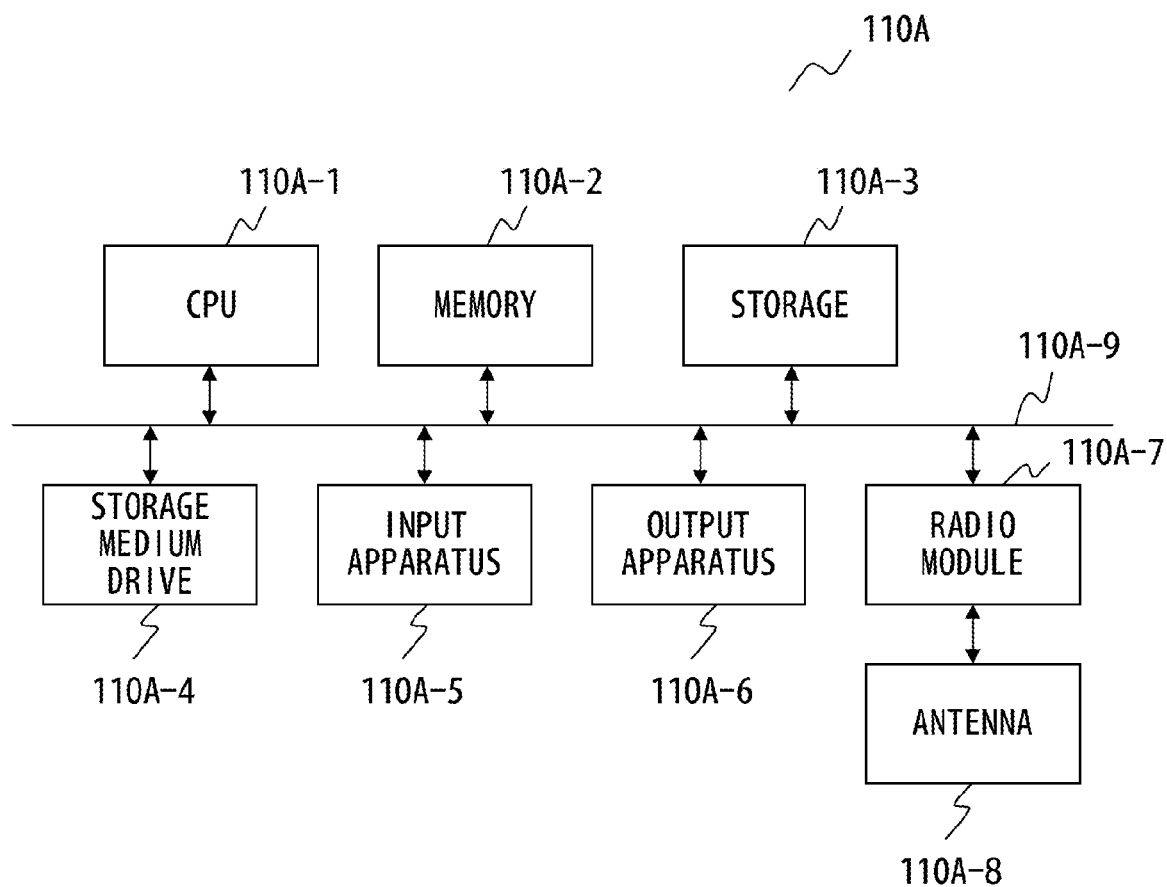
F I G. 7

F I G. 1 0

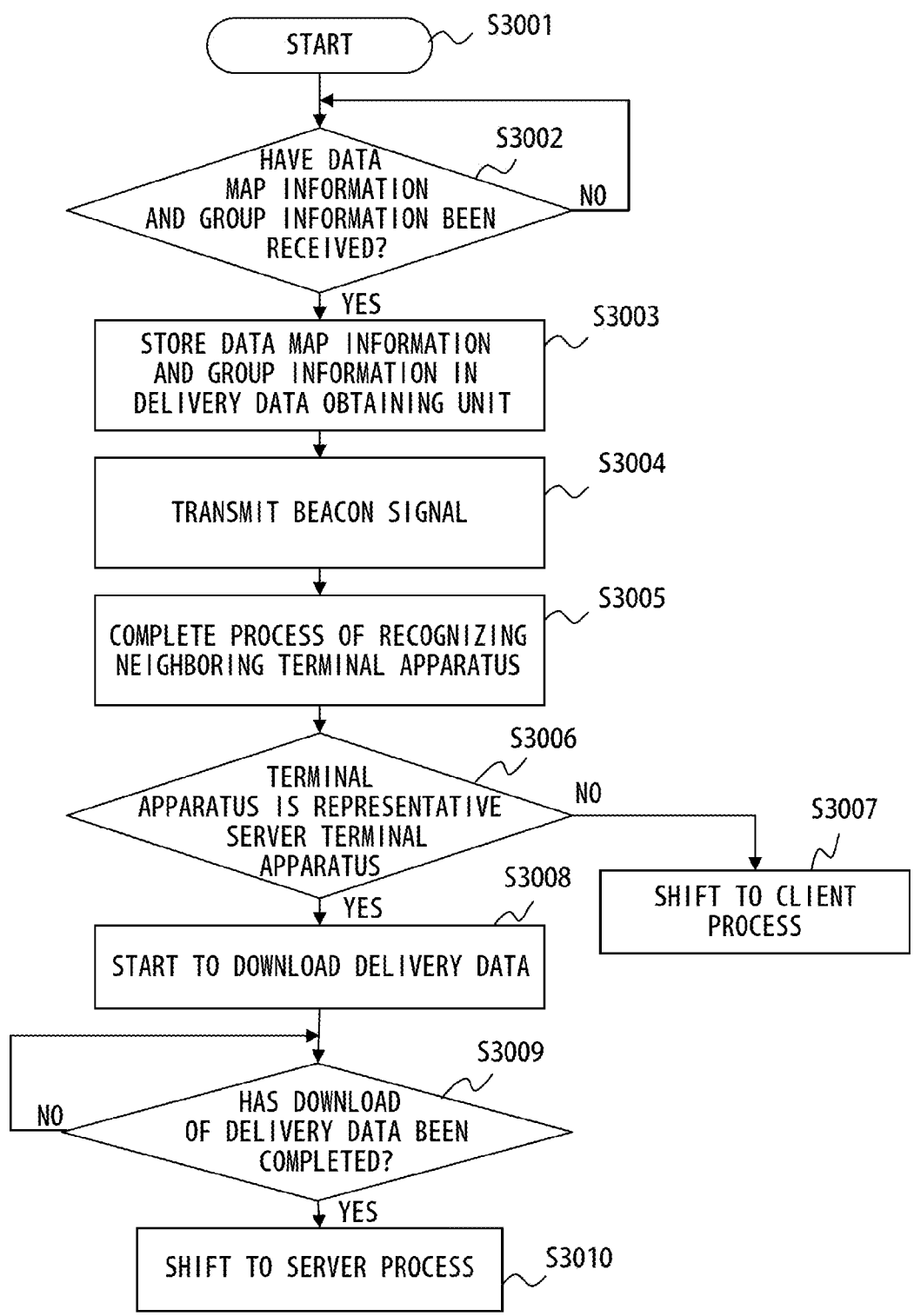
F I G. 13

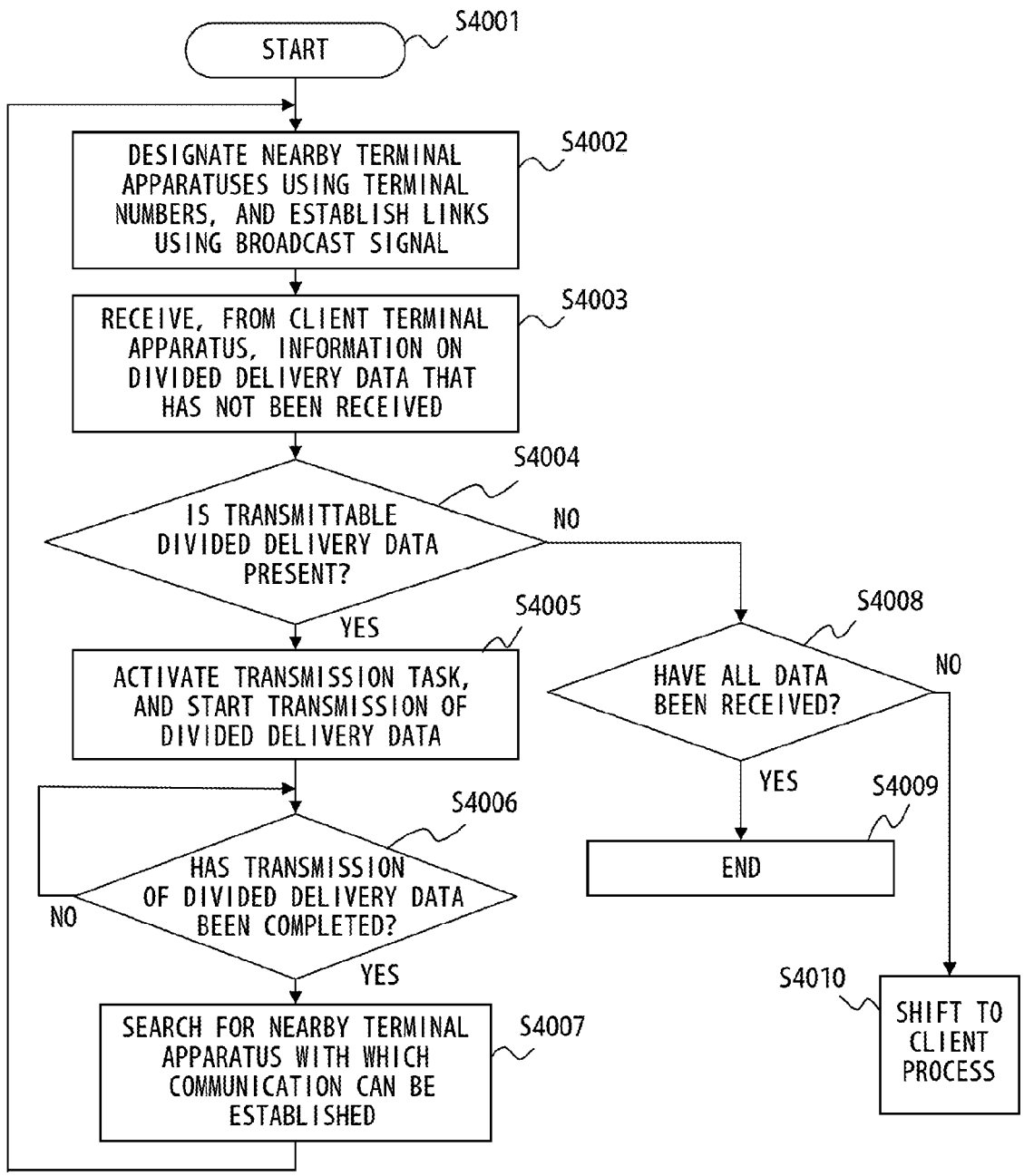
F I G. 14

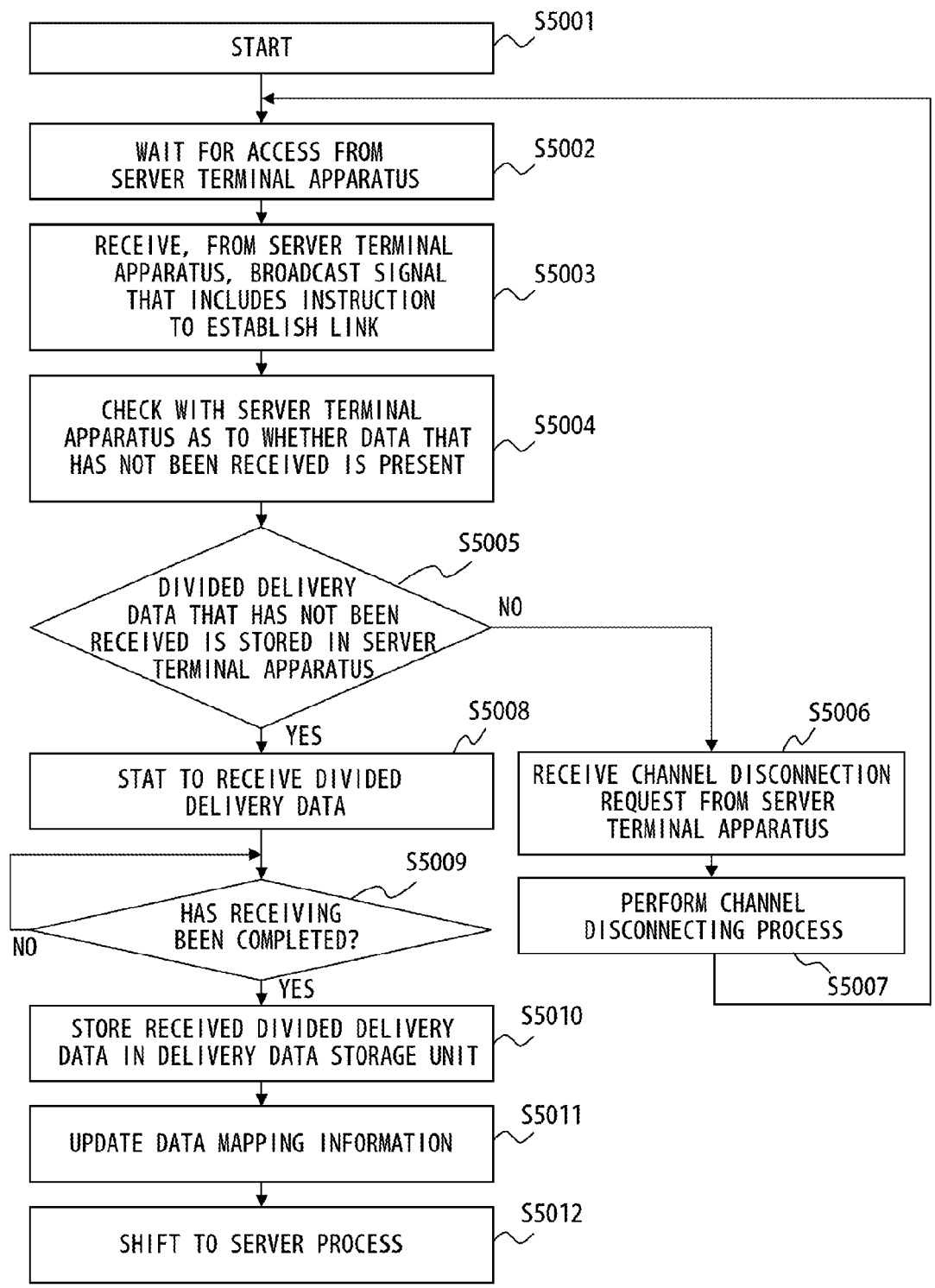
F I G. 1 5

RADIO ACCESS SYSTEM, CONTROLLING APPARATUS, AND TERMINAL APPARATUS

CROSS-REFERENCE TO RELATED APPLICATION

This application is based upon and claims the benefit of priority of the prior Japanese Patent Application No. 2014-027462, filed on Feb. 17, 2014, the entire contents of which are incorporated herein by reference.

FIELD

The embodiments discussed herein are related to a radio access system, a controlling apparatus, and a terminal apparatus.

BACKGROUND

In recent years, communications have been unable to be established in some cases because many terminal apparatuses use packet communication services provided by a radio communication system beyond the capacity of a communications infrastructure such as a base station apparatus. Recently, cellular phones called "smartphones" and information communication terminal apparatuses called "tablet terminals" have tended to become widespread. Terminal apparatuses, including cellular phones and information communication terminal apparatuses, could be capable of downloading data of large size such as still images and moving images from a data delivery server via a base station apparatus. Accordingly, in an area where many terminal apparatuses may possibly be present, a case could occur where a data delivery server attempts to simultaneously deliver data of large size to many terminal apparatuses via a base station apparatus that covers communications in that area. If that case happens in a best-effort communication service wherein a plurality of terminal apparatuses could share the bandwidth of communications infrastructures, congestion may possibly occur in a particular communications infrastructure within a radio commutation system.

Specific examples of areas where many terminal apparatuses may possibly be present include, for example, sites for seminars, concert venues, event sites, and rush-hour station yards. In such areas, many terminal apparatuses may be geographically concentrated beyond the capacity of a base station apparatus that covers communications in that area. Data delivered from a data delivery server to many terminal apparatuses within such an area includes, for example, texts delivered from a promoter to guests, site guides with pictures, moving-picture-based schedules, apps needed to attend an event, moving-image data for setting the mood for a concert prior to the start, information for emergency guidance in a venue or station yard, and lost child reports. The data includes information to be shared among many users within the area, and hence an attempt is made to deliver the data to individual terminal apparatuses of many users within the area. Making an attempt to deliver data to many terminal apparatuses within a particular area may cause processing intended for those many terminal apparatuses to be excessively concentrated on a particular communications infrastructure such as a base station apparatus that covers communications in that area, leading to congestion in the particular communications infrastructure.

As described above, in a particular area where many terminal apparatuses could be present, since congestion may possibly occur in a particular communications infrastructure within a radio communication system, it is difficult to simultaneously deliver data of large size from a data delivery server to the many terminal apparatuses.

The following is known as a technology related to a local network for mobile communication devices. A mobile terminal is connected to other mobile terminals so as to form an ad-hoc local network. The mobile terminal determines whether a file requested by a user is available from the local network. When the file is available via the local network, the mobile terminal retrieves the file from the local network. In a case where the file is not available via the local network, when the file is available on a cellular network generated by a base station, the mobile terminal retrieves the file from the cellular network.

In addition, the following is known as a technology related to a wireless ad-hoc network. Each wireless terminal connected to a wireless ad-hoc network retrieves other wireless terminals existing in a communication range by wireless communication to create a neighboring terminal list. Each wireless terminal selects a group leader candidate terminal based on a predetermined selection criterion from the created neighboring terminal list, and carries out a request for a group leader for the selected group leader candidate terminal. The wireless terminal having received the request for a group leader sends acceptance or rejection. Each wireless terminal reports to the other wireless terminals in the neighboring terminal list that the group leader in the own group thereof has been selected.

PRIOR ART DOCUMENTS

Patent Documents

Patent document 1: Japanese National Publication of International Patent Application No. 2009-538019
Patent document 2: Japanese Laid-open Patent Publication No. 2010-45525

SUMMARY

According to an aspect of the embodiments, a radio access system includes a controlling apparatus and a terminal apparatus. The controlling apparatus receives position information transmitted from terminal apparatuses, and stores the received position information. The controlling apparatus obtains, from among the stored position information, position information of destination terminal apparatuses to which delivery data is to be delivered. When the destination terminal apparatuses are judged to be concentrated in a particular area in accordance with the obtained position information, the controlling apparatus groups the destination terminal apparatuses present in the particular area together as a terminal apparatus group. The controlling apparatus selects a representative server terminal apparatus from the terminal apparatuses included in the terminal apparatus group. The controlling apparatus transmits group information related to the terminal apparatuses included in the terminal apparatus group to each of the terminal apparatuses included in the terminal apparatus group. The controlling apparatus creates data map information indicating a delivery rule for delivering the delivery data from the representative server terminal apparatus to another terminal apparatus within the terminal apparatus group. The controlling apparatus adds information for identification of the representative server terminal apparatus to the created data map information, and transmit the data map information to each of the terminal apparatuses included in the terminal apparatus group. The controlling apparatus instructs a delivery data server to deliver the delivery data to the representative server terminal apparatus. The terminal apparatus transmits the position information of the terminal apparatus to the controlling apparatus. The terminal apparatus receives the group information and data map information transmitted from the controlling apparatus. The terminal apparatus obtains the delivery data that the representative server terminal apparatus has obtained from the delivery data server, by communicating, in accordance with the received data map information, with the another terminal apparatus within the terminal apparatus group included in the received group information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an exemplary functional configuration diagram of a congestion suppressing apparatus in accordance with an embodiment;

FIG. 3 is an exemplary diagram of a group information database in accordance with an embodiment;

FIG. 4 is an exemplary diagram of data map information in accordance with an embodiment;

FIG. 5 is an exemplary hardware configuration diagram of a congestion suppressing apparatus in accordance with an embodiment;

FIG. 7 is an exemplary hardware configuration diagram of a terminal apparatus in accordance with an embodiment;

FIG. 10 is an explanatory diagram of an exemplary terminal apparatus group for which data delivery is performed in accordance with an embodiment;

FIG. 13 is an exemplary flow diagram of a process of obtaining delivery data, the process being performed by a terminal apparatus in accordance with an embodiment;

FIG. 14 is an exemplary flow diagram of a server process performed by a terminal apparatus in accordance with an embodiment; and FIG. 15 is an exemplary flow diagram of a client process performed by a terminal apparatus in accordance with an embodiment.

DESCRIPTION OF EMBODIMENTS

The following will describe embodiments with reference to the drawings.

Figure 1:
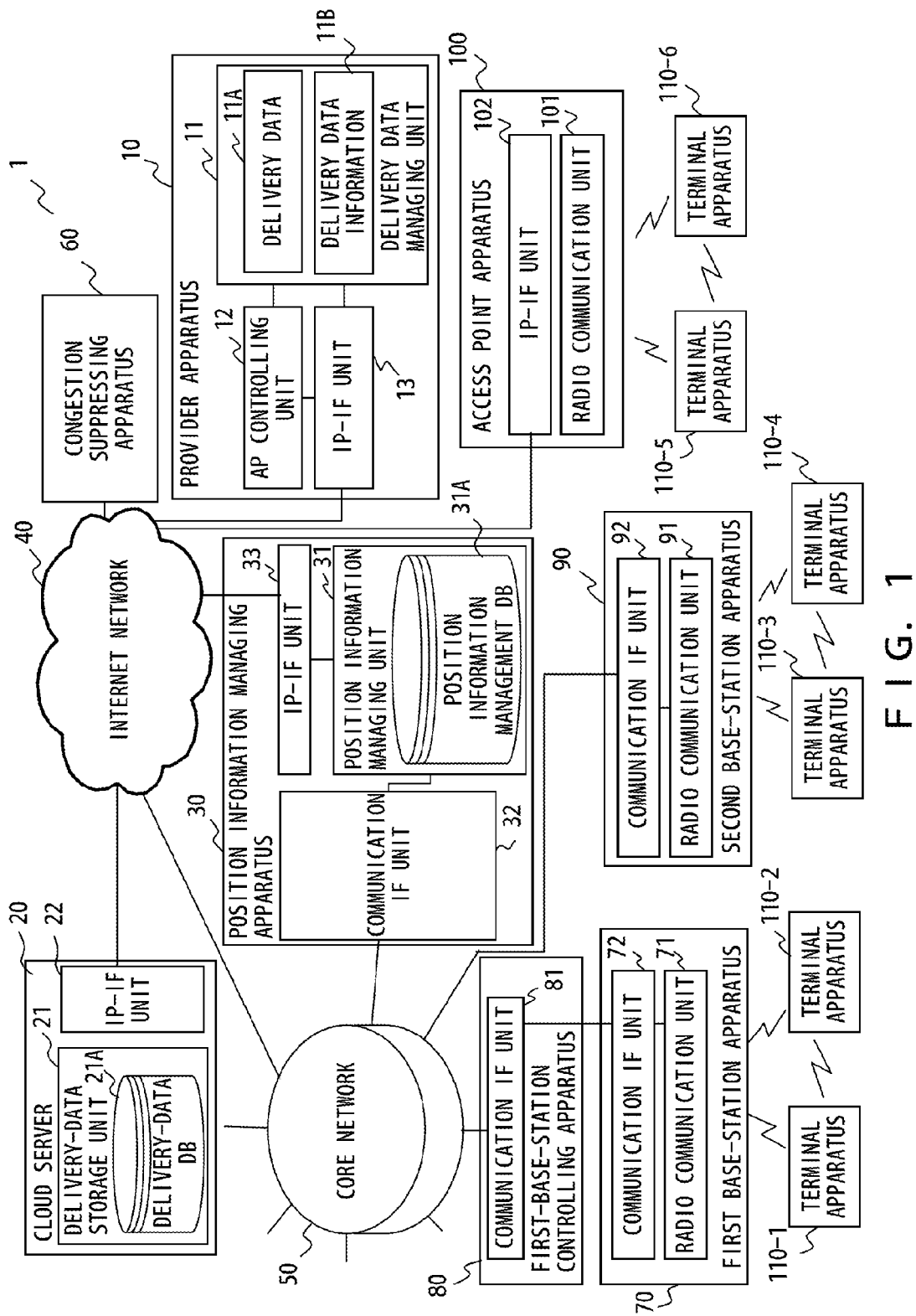
FIG. 1 is an exemplary configuration diagram of a radio access system in accordance with an embodiment.

FIG. 1 is an exemplary configuration diagram of a radio access system in accordance with an embodiment. As illustrated in FIG. 1, a radio access system 1 includes a provider apparatus 10, a cloud server 20, a position information managing apparatus 30, an Internet network 40, and a core network 50. The radio access system 1 also includes a congestion suppressing apparatus 60, a first base station apparatus 70, a first-base-station controlling apparatus 80, a second base station apparatus 90, an access point apparatus 100, and terminal apparatuses 110-1 to 110-6. In the of the radio access system 1 depicted in FIG. 1, the position information managing apparatus 30, the core network 50, the first base station apparatus 70, the first-base-station controlling apparatus 80, the second base station apparatus 90, and the access point apparatus 100 are included in a radio access network that connects the terminal apparatuses 110-1 to 110-6 to the Internet network 40.

The plurality of terminal apparatuses 110-1 to 110-6 will hereinafter be referred to as a "terminal apparatus 110" when these apparatuses are not particularly distinguished from each other. The first base station apparatus 70, the second base station apparatus 90, and the access point apparatus 100 will hereinafter simply be referred to as a "base station apparatus" when these apparatuses are not particularly distinguished from each other.

The provider apparatus 10 connects an information processing apparatus (not illustrated) of a user, such as a promoter of a seminar or event, to the Internet network 40. The provider apparatus 10 includes a delivery data managing unit 11, an Access Point (AP) controlling unit 12, and an Internet Protocol Interface (IP-IF) unit 13.

The delivery data managing unit 11 receives and holds delivery data 11A and delivery data information 11B transmitted from an information processing apparatus (not illustrated) of a user. Delivery data 11A is data to be transmitted to a terminal apparatus 110 designated by the information processing apparatus of the user. Delivery data information 11B includes information on the terminal apparatus 110 to which delivery data 11A is delivered, and the data size of delivery data 11A. The delivery data managing unit 11 transmits the delivery data 11A that has been held to the cloud server 20 via the IP-IF unit 13. The delivery data managing unit 11 also transmits the delivery data information 11B that has been held to the congestion suppressing apparatus 60 via the IP-IF unit 13.

The access point apparatus 100 performs control on the access point controlling unit 12. The provider apparatus 10 is connected to the Internet network 40 via the IP-IF unit 13.

The cloud server 20 is a data delivery server that stores the delivery data 11A transmitted from the provider apparatus 10 and that delivers the stored delivery data 11A to a predetermined destination apparatus. The cloud server 20 includes a delivery data storage unit 21 and an IP-IF unit 22. The cloud server 20 is connected to the Internet network 40 via the IP-IF unit 22.

The delivery data storage unit 21 receives the delivery data 11A transmitted from the provider apparatus 10 via the IP-IF unit 22, and stores the received delivery data in a delivery data database (DB) 21A. The delivery data storage unit 21 also receives, from the congestion suppressing apparatus 60 via the IP-IF unit 22, a request to transmit the delivery data 11A stored in the delivery data database 21A to a predetermined terminal apparatus 110. In response to a received request, the delivery data storage unit 21 transmits the delivery data 11A stored in the delivery data database 21A to the predetermined terminal apparatus 110 via the IP-IF unit 22.

The position information managing apparatus 30 manages position information indicating the position of a terminal apparatus 110 included in the radio access system 1. The position information managing apparatus 30 includes a position information managing unit 31, a communication interface (IF) unit 32, and an IP-IF unit 33.

The position information managing unit 31 receives position information transmitted from each terminal apparatus 110 via the communication interface unit 32, and records each piece of the received position information in a position information management database (DB) 31A. The position information managing apparatus 30 is connected to the core network 50 via the communication interface unit 32 and to the Internet network 40 via the IP-IF unit 33. The core network 50 is an Internet Protocol (IP) core network that connects a radio access network and the Internet network 40 to each other.

The congestion suppressing apparatus 60 is an exemplary controlling apparatus in accordance with an embodiment. The congestion suppressing apparatus 60 obtains position information of a terminal apparatus 110 via the position information managing apparatus 30. The congestion suppressing apparatus 60 receives a delivery instruction for delivery data 11A from the provider apparatus 10. Using the obtained position information, the congestion suppressing apparatus 60 specifies terminal apparatuses 110 geographically concentrated in a particular area from among the terminal apparatuses 110 to which delivery data 11A is to be delivered. The congestion suppressing apparatus 60 groups the specified terminal apparatuses 110 together as a terminal apparatus group. To identify each of the grouped terminal apparatuses 110, the congestion suppressing apparatus 60 assigns a unique terminal apparatus number to each of the terminal apparatuses 110. The congestion suppressing apparatus 60 selects a representative server terminal apparatus from the grouped terminal apparatuses 110 included in the terminal apparatus group.

The representative server terminal apparatus is a terminal apparatus 110 that, on behalf of all of the terminal apparatuses 110 within the terminal apparatus group, receives delivery data 11A from the cloud server 20 via a base station apparatus and transmits the received delivery data to the other terminal apparatuses 110 within the terminal apparatus group. The representative server terminal apparatus receives delivery data 11A from the cloud server 20 via a base station apparatus on behalf of all of the terminal apparatuses 110 within the terminal apparatus group, so that congestion in a communications infrastructure such as a base station apparatus may be suppressed in delivering delivery data 11A from the side of the radio access network to each terminal apparatus 110 within the terminal apparatus group.

The congestion suppressing apparatus 60 divides delivery data 11A into a plurality of pieces of divided delivery data and generates data map information indicating the position of each piece of divided delivery data within delivery data 11A. As will be described in detail hereinafter, the delivery data 11A received by the representative server terminal apparatus is delivered to each of the terminal apparatuses 110 within the terminal apparatus group via communications between the terminal apparatuses 110 included in the terminal apparatus group. Accordingly, dividing delivery data 11A into a plurality of pieces of divided delivery data shortens the cycle of transmission and reception of the delivery data 11A between the terminal apparatuses 110, thereby shortening the wait time for transmission and/or reception of delivery data 11A.

Such a configuration allows delivery data 11A to be completely delivered from the representative server terminal apparatus to each of the terminal apparatuses 110 within the terminal apparatus group in a short time.

The congestion suppressing apparatus 60 transmits, as group information, information on the terminal apparatus group that includes the grouped terminal apparatuses 110 to each of the terminal apparatuses 110 included in the terminal apparatus group. In addition, the congestion suppressing apparatus 60 adds terminal apparatus information to the data map information for delivery data 11A and transmits the data map information to which terminal apparatus information has been added to each of the terminal apparatuses 110 included in the terminal apparatus group. Terminal apparatus information includes the terminal apparatus number of a terminal apparatus 110 to which data map information is transmitted. Terminal apparatus information further includes information indicating whether or not the terminal apparatus 110 is a representative server terminal apparatus. The terminal apparatus number may be used to distinguish whether or not the terminal apparatus 110 is a representative server terminal apparatus.

FIG. 2 is an exemplary functional configuration diagram of a congestion suppressing apparatus in accordance with an embodiment. As illustrated in FIG. 2, the congestion suppressing apparatus 60 includes a position information managing unit 61, a grouping unit 62, a data mapping unit 63, and an IP-IF unit 64. The congestion suppressing apparatus 60 is connected to the Internet network 40 via the IP-IF unit 64.

The position information managing unit 61 obtains, via the IP-IF unit 64, position information of each of the terminal apparatuses 110 held by the position information managing apparatus 30, and records the obtained position information in a position information management database (DB) 61A in association with an identifier of the terminal apparatus 110. The position information managing unit 61 obtains area information such as a map or building information from a map-data providing server (not illustrated) and/or an area quality server (not illustrated), and holds the obtained area information. The map-data providing server is a server to provide map data, e.g., Google Maps, and may be connected to the Internet network 40. The area quality server is a server to collect information indicating the current position of a terminal apparatus 110 and information indicating a radio quality for that position. The area quality server may be connected to the core network 50.

When a delivery instruction for delivery data 11A is received from the provider apparatus 10 via the IP-IF unit 64, the grouping unit 62 obtains, from the position information managing unit 61, position information of the terminal apparatuses 110 to which delivery data 11A is to be delivered. The grouping unit 62 also obtains, from the position information managing unit 61, area information of a neighboring area of the position indicated by the obtained position information. The grouping unit 62 compares the obtained position information and the obtained area information with each other and specifies terminal apparatuses 110 geographically concentrated in a particular area from among the delivery-destination terminal apparatuses 110. The particular area is, for example, an event site, concert venue, or station yard. The grouping unit 62 groups the specified terminal apparatuses 110 together as a terminal apparatus group.

To identify each of the grouped terminal apparatuses 110 included in the terminal apparatus group, the grouping unit 62 assigns a unique terminal apparatus number to each of the terminal apparatuses 110. The grouping unit 62 also selects one or more representative server terminal apparatuses from the grouped terminal apparatuses 110 included in the terminal apparatus group. The grouping unit 62 stores in a group information database 62A, as group information, information on the terminal apparatus group, such as the terminal apparatus number of each of the terminal apparatuses 110 included in the terminal apparatus group and/or information on the representative server terminal apparatus. FIG. 3 is an exemplary diagram of a group information database in accordance with an embodiment. In the depicted in FIG. 3, the group information database 62A includes six pieces of group information. Each piece of group information includes an "area number", a "total number of terminals", a "group identifier (ID)", and a "terminal apparatus number". An area number indicates a number indicating a particular area corresponding to a terminal apparatus group. The total number of terminals indicates the number of terminal apparatuses 110 included in the terminal apparatus group. A group identifier indicates a unique number for identification of each terminal apparatus group. A terminal apparatus number may identify a representative server terminal apparatus. The grouping unit 62 transmits group information to the data mapping unit 63. The grouping unit 62 also transmits group information to each terminal apparatus 110 within a terminal apparatus group via the IP-IF unit 64.

The data mapping unit 63 receives a delivery instruction for delivery data 11A from the provider apparatus 10 via the IP-IF unit 64. The delivery instruction received from the provider apparatus 10 includes delivery data information 11B. Delivery data information 11B is information on the delivery data 11A which an information processing apparatus of a user has made a request for the provider apparatus 10 to deliver. Delivery data information 11B includes identification information of a delivery-destination terminal apparatus 110 designated by the information processing apparatus of the user, and the data size of the delivery data 11A. The data mapping unit 63 records the received delivery data information 11B in a delivery data information database 63A.

The data mapping unit 63 receives group information from the grouping unit 62. Using the data size of the received delivery data 11A and the number of terminal apparatuses 110 included in the terminal apparatus group indicated by the received group information, the data mapping unit 63 determines a division size of delivery data 11A. The data mapping unit 63 generates a plurality of pieces of divided delivery data by dividing delivery data 11A in accordance with the determined division size. The data mapping unit 63 creates data map information for delivery data 11A by assigning addresses indicating the positions of the pieces of divided delivery data within delivery data 11A to the pieces of divided delivery data. FIG. 4 is an exemplary diagram of data map information in accordance with an embodiment. In the depicted in FIG. 4, delivery data 11A is divided into 120 pieces of divided delivery data indicated by block numbers 1-120. In the example depicted in FIG. 4, the 120 pieces of divided delivery data are each assigned any of two dimensional addresses consisting of X addresses 1-30 and Y addresses 1-4. The two dimensional addresses each specify the position of a piece of divided delivery data within delivery data 11A.

The data mapping unit 63 transmits the created data map information to each of the terminal apparatuses 110 within the terminal apparatus group via the IP-IF unit 64.

FIG. 5 is an exemplary hardware configuration diagram of a congestion suppressing apparatus in accordance with an embodiment. As illustrated in FIG. 5, a congestion suppressing apparatus 60A includes a Central Processing Unit (CPU) 60A-1, a memory 60A-2, a storage 60A-3, a storage medium drive 60A-4, an input apparatus 60A-5, an output apparatus 60A-6, a communication interface 60A-7, and a bus 60A-8. The CPU 60A-1, the memory 60A-2, the storage 60A-3, the storage medium drive 60A-4, the input apparatus 60A-5, the output apparatus 60A-6, and the communication interface 60A-7 are connected to each other by the bus 60A-8.

The CPU 60A-1 is a logical circuit that performs arithmetic processing. The memory 60A-2 is a main storage apparatus which is directly accessible by the CPU 60A-1. The memory 60A-2 temporarily stores data during processing and a program in the process of being executed by the CPU 60A-1. The memory 60A-2 is, for example, a Synchronous Dynamic Random Access Memory (SDRAM). The CPU 60A-1 and the memory 60A-2 may correspond to the position information managing unit 61, the grouping unit 62, and the data mapping unit 63.

The storage 60A-3 is, for example, a Hard Disk Drive (HDD) or flash memory. The storage 60A-3 stores various programs and data to be executed by the CPU 60A-1. The storage 60A-3 may correspond to the position information management database 61A, the group information database 62A, and the delivery data information database 63A.

The storage medium drive 60A-4 is an apparatus for reading data recorded in a recording medium and/or writing data processed by the CPU 60A-1 to the recording medium. The recording medium is, for example, a Compact Disk Read Only Memory (CD-ROM), Digital Versatile Disk (DVD), Universal Serial Bus (USB) memory, Secure Digital (SD) card, or flash memory.

The input apparatus 60A-5 is an apparatus used by the user of the congestion suppressing apparatus 60A to input an instruction to the congestion suppressing apparatus 60A. The input apparatus 60A-5 is, for example, a keyboard, mouse, or touch panel. The output apparatus 60A-6 is an apparatus for displaying a processing result of the CPU 60A-1. The output apparatus 60A-6 is, for example, a liquid crystal display. The communication interface 60A-7 is an apparatus for establishing a connection to an external packet network such as the Internet network. The communication interface 60A-7 may correspond to the IP-IF unit 64.

The first base station apparatus 70 depicted in FIG. 1 is a base station apparatus wirelessly connected to a terminal apparatus 110 having a communication function conforming to a first communication standard. The first communication standard is, for example, a Third Generation (3G) communication standard defined by a specification of Third Generation Partnership Project (3GPP). The first base station apparatus 70 includes a radio communication unit 71 and a communication interface (IF) unit 72.

The first base station apparatus 70 transmits signals to and receives signals from the terminal apparatus 110 via the radio communication unit 71, the terminal apparatus 110 conforming to the first communication standard. The first base station apparatus 70 also transmits signals to and receives signals from the first-base-station controlling apparatus 80 via the communication interface unit 72. Although FIG. 1 depicts one first base station apparatus 70, the radio access system 1 may include any number of first base station apparatuses 70.

The first-base-station controlling apparatus 80 is a radio network controlling apparatus that manages corresponding first base station apparatuses 70. The first-base-station controlling apparatus 80 includes a communication interface (IF) unit 81, and transmits signals to and receives signals from the first base station apparatus 70 and the core network 50 via the communication interface unit 81. Although FIG. 1 depicts one first-base-station controlling apparatus 80, the radio access system 1 may include any number of first-base-station controlling apparatuses 80.

The second base station apparatus 90 is a base station apparatus wirelessly connected to a terminal apparatus 110 having a communication function conforming to a second communication standard. The second communication standard is, for example, the Long Term Evolution (LTE) defined by a specification of 3GPP. The second base station apparatus 90 includes a radio communication unit 91 and a communication interface (IF) unit 92.

The second base station apparatus 90 transmits signals to and receives signals from the terminal apparatus 110 via the radio communication unit 91, the terminal apparatus 110 conforming to the second communication standard. The second base station apparatus 90 also transmits signals to and receives signals from the core network 50 via the communication interface unit 92. Although FIG. 1 depicts one second base station apparatus 90, the radio access system 1 may include any number of second base station apparatuses 90.

The access point apparatus 100 is a communication apparatus wirelessly connected to a terminal apparatus 110 having a communication function conforming to a third communication standard. The third communication standard is a standard for a wireless Local Area Network (LAN), e.g., Wireless Fidelity (WiFi). A terminal apparatus 110 having a communication function conforming to the first or second communication standard may have a communication function conforming to the third communication standard. The access point apparatus 100 includes a radio communication unit 101 and an IP-IF unit 102.

The access point apparatus 100 transmits signals to and receives signals from the terminal apparatus 110 via the radio communication unit 101, the terminal apparatus 110 conforming to the third communication standard. The access point apparatus 100 is connected to the Internet network 40 via the IP-IF unit 102. Although FIG. 1 depicts one access point apparatus 100, the radio access system 1 may include any number of access point apparatuses 100.

The terminal apparatuses 110-1 to 110-6 are, for example, User Equipment (UE) defined by a specification of 3GPP, and include a cellular phone called a smartphone and an information communication terminal apparatus called a tablet terminal.

In the example depicted in FIG. 1, the terminal apparatuses 110-1 and 110-2 are wirelessly connected to the first base station apparatus 70 in accordance with the first communication standard, and perform communications via the first base station apparatus 70; the terminal apparatuses 110-3 and 110-4 are wirelessly connected to the second base station apparatus 90 in accordance with the second communication standard, and perform communications via the second base station apparatus 90; and the terminal apparatuses 110-5 and 110-6 are wirelessly connected to the access point apparatus 100 in accordance with the third communication standard, and perform communications via the access point apparatus 100. FIG. 1 depicts an example for illustrating the radio access system 1, and any number of terminal apparatuses 110 can be connected to each base station apparatus.

In the example depicted in FIG. 1, the terminal apparatuses 110-1 and 110-2 are wirelessly connected to each other in accordance with a fourth communication standard, and communications are performed therebetween; the terminal apparatuses 110-3 and 110-4 are wirelessly connected to each other in accordance with the fourth communication standard, and communications are performed therebetween; and the terminal apparatuses 110-5 and 110-6 are wirelessly connected to each other in accordance with the fourth communication standard, and communications are performed therebetween. The fourth communication standard is a short-distance radio communication standard, e.g., WiFi, Bluetooth, or Near Field Communication (NFC). FIG. 1 depicts an example for illustrating the radio access system 1; one terminal apparatus 110 may be wirelessly connected to a plurality of terminal apparatuses 110 in accordance with the fourth communication standard, and the one terminal apparatus 110 may communicate with the plurality of terminal apparatuses 110.

Figure 6:
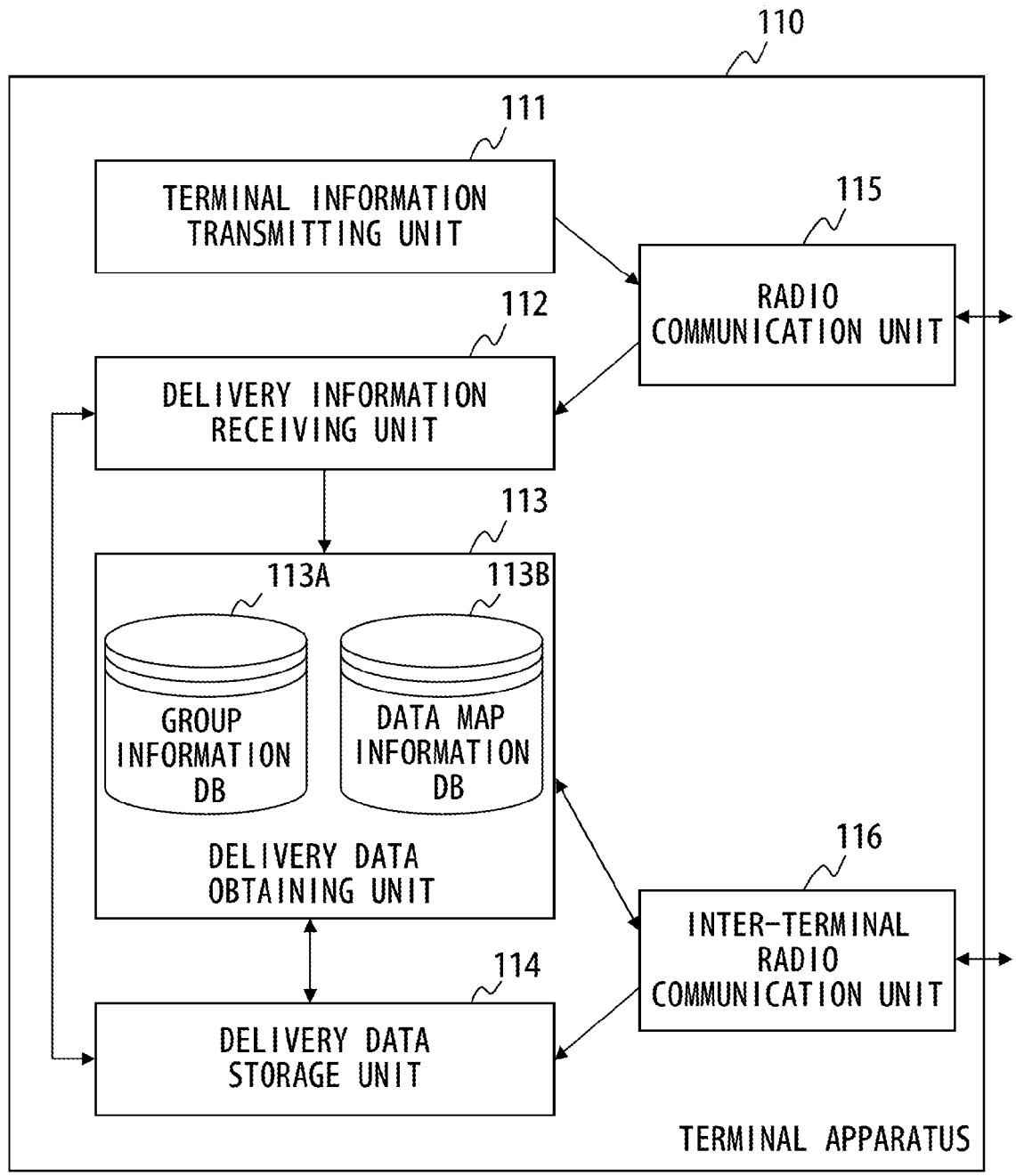
FIG. 6 is an exemplary functional configuration diagram of a terminal apparatus in accordance with an embodiment.

FIG. 6 is an exemplary functional configuration diagram of a terminal apparatus in accordance with an embodiment. As illustrated in FIG. 6, the terminal apparatus 110 includes a terminal information transmitting unit 111, a delivery information receiving unit 112, a delivery data obtaining unit 113, a delivery data storage unit 114, a radio communication unit 115, and an inter-terminal radio communication unit 116.

The terminal information transmitting unit 111 transmits position information indicating the position of the terminal apparatus 110 to the position information managing apparatus 30 via the radio communication unit 115. The terminal information transmitting unit 111 may transmit model information and/or power information of the terminal apparatus 110 to the congestion suppressing apparatus 60 via the radio communication unit 115. The power information of the terminal apparatus 110 indicates, for example, the battery residual quantity of the terminal apparatus 110 and the state of a connection to an external power source such as an Alternative Current (AC) power source.

The delivery information receiving unit 112 receives group information and data map information from the congestion suppressing apparatus 60 via the radio communication unit 115. Group information is information on a terminal apparatus group that includes a terminal apparatus 110 to which delivery data 11A is to be delivered. The group information received by the delivery information receiving unit 112 is group information on a terminal apparatus group that includes the terminal apparatus 110. Data map information indicates a data map for pieces of divided delivery data obtained by dividing delivery data 11A. The data map information received by the delivery information receiving unit 112 is data map information for the delivery data 11A for which the terminal apparatus 110 is designated as a delivery-destination terminal apparatus 110.

The delivery information receiving unit 112 may receive the delivery data 11A transmitted from the cloud server 20 via the radio communication unit 115. When, for example, the terminal apparatus 110 is a representative server terminal apparatus, the delivery information receiving unit 112 receives the delivery data 11A transmitted from the cloud server 20 via the radio communication unit 115. The delivery information receiving unit 112 stores the received delivery data 11A in the delivery data storage unit 114.

The delivery data obtaining unit 113 performs a process for obtaining delivery data 11A via communication between terminal apparatuses 110. The delivery data obtaining unit 113 receives group information and data map information from the delivery information receiving unit 112. The delivery data obtaining unit 113 records the received group information in a group information database (DB) 113A and records the received data map information in a data map information database (DB) 113B. The delivery data obtaining unit 113 transmits a piece of divided delivery data specified by data map information to and receives such a piece of divided data from a terminal apparatus 110 included in a terminal apparatus group indicated by group information via the inter-terminal radio communication unit 116.

A terminal apparatus 110 to which or from which the delivery data obtaining unit 113 directly transmits or receives pieces of divided delivery data is another terminal apparatus 110 that is capable of performing communication in accordance with the fourth communication standard and that is located in the vicinity of the terminal apparatus 110. To cause a neighboring terminal apparatus 110 to recognize the presence of the terminal apparatus 110, the delivery data obtaining unit 113 may transmit a beacon signal to the neighboring terminal apparatus 110 via the inter-terminal radio communication unit 116 at a unique transmission timing assigned to each terminal apparatus 110 within the terminal apparatus group.

The delivery data obtaining unit 113 transmits pieces of divided delivery data stored in the delivery data storage unit 114 to a neighboring terminal apparatus 110 via the inter-terminal radio communication unit 116. The delivery data obtaining unit 113 also receives pieces of divided delivery data transmitted from the neighboring terminal apparatus 110 via the inter-terminal radio communication unit 116 and stores these pieces of divided data in the delivery data storage unit 114.

The pieces of divided delivery data stored in the delivery data storage unit 114 are assembled in accordance with the data map information received by the delivery data obtaining unit 113. When all of the pieces of divided delivery data included in delivery data 11A are stored in the delivery data storage unit 114, the pieces of divided delivery data within the delivery data storage unit 114 are combined into one piece of delivery data 11A.

The radio communication unit 115 is connected to a base station apparatus in accordance with one of the first to third communication standards, and transmits signals to and receives signals from the base station apparatus. The inter-terminal radio communication unit 116 is connected to an neighboring terminal apparatus 110 of the terminal apparatus 110 in accordance with the fourth communication standard, and transmits signals to and receives signals from the neighboring terminal apparatus 110.

FIG. 7 is an exemplary hardware configuration diagram of a terminal apparatus in accordance with an embodiment. As illustrated in FIG. 7, a terminal apparatus 110A includes a CPU 110A-1, a memory 110A-2, a storage 110A-3, a storage medium drive 110A-4, an input apparatus 110A-5, an output apparatus 110A-6, a radio module 110A-7, an antenna 110A-8, and a bus 110A-9. The CPU 110A-1, the memory 110A-2, the storage 110A-3, the storage medium drive 110A-4, the input apparatus 110A-5, the output apparatus 110A-6, and the radio module 110A-7 are connected to each other by the bus 110A-9.

The CPU 110A-1 is a logical circuit that performs arithmetic processing. The memory 110A-2 is a main storage apparatus which is directly accessible by the CPU 110A-1. The memory 110A-2 temporarily stores data during processing and a program in the process of being executed by the CPU 110A-1. The memory 110A-2 is, for example, an SDRAM. The CPU 110A-1 and the memory 110A-2 may correspond to the terminal information transmitting unit 111, the delivery information receiving unit 112, and the delivery data obtaining unit 113.

The storage 110A-3 is, for example, a hard disk drive or flash memory. The storage 110A-3 stores various programs and data to be executed by the CPU 110A-1. The storage 110A-3 may correspond to the group information database 113A and the data map information database 113B.

The storage medium drive 110A-4 is an apparatus for reading data recorded in a recording medium and/or writing data processed by the CPU 110A-1 to the recording medium. The recording medium is, for example, a CD-ROM, DVD, USB memory, SD card, or flash memory.

The input apparatus 110A-5 is an apparatus used by the user of the terminal apparatus 110A to input an instruction to the terminal apparatus 110A. The input apparatus 110A-5 is, for example, a keyboard, mouse, or touch panel. The output apparatus 110A-6 is an apparatus for displaying a processing result of the CPU 110A-1. The output apparatus 110A-6 is, for example, a liquid crystal display. The radio module 110A-7 is an apparatus that transmits and receives radio signals via an antenna 110-9 in accordance with any of the first to fourth communication standards. The radio module 110A-7 may correspond to the radio communication unit 115 and the inter-terminal radio communication unit 116.

The following will describe an exemplary data delivering process performed by the radio access system 1.

Figure 8:
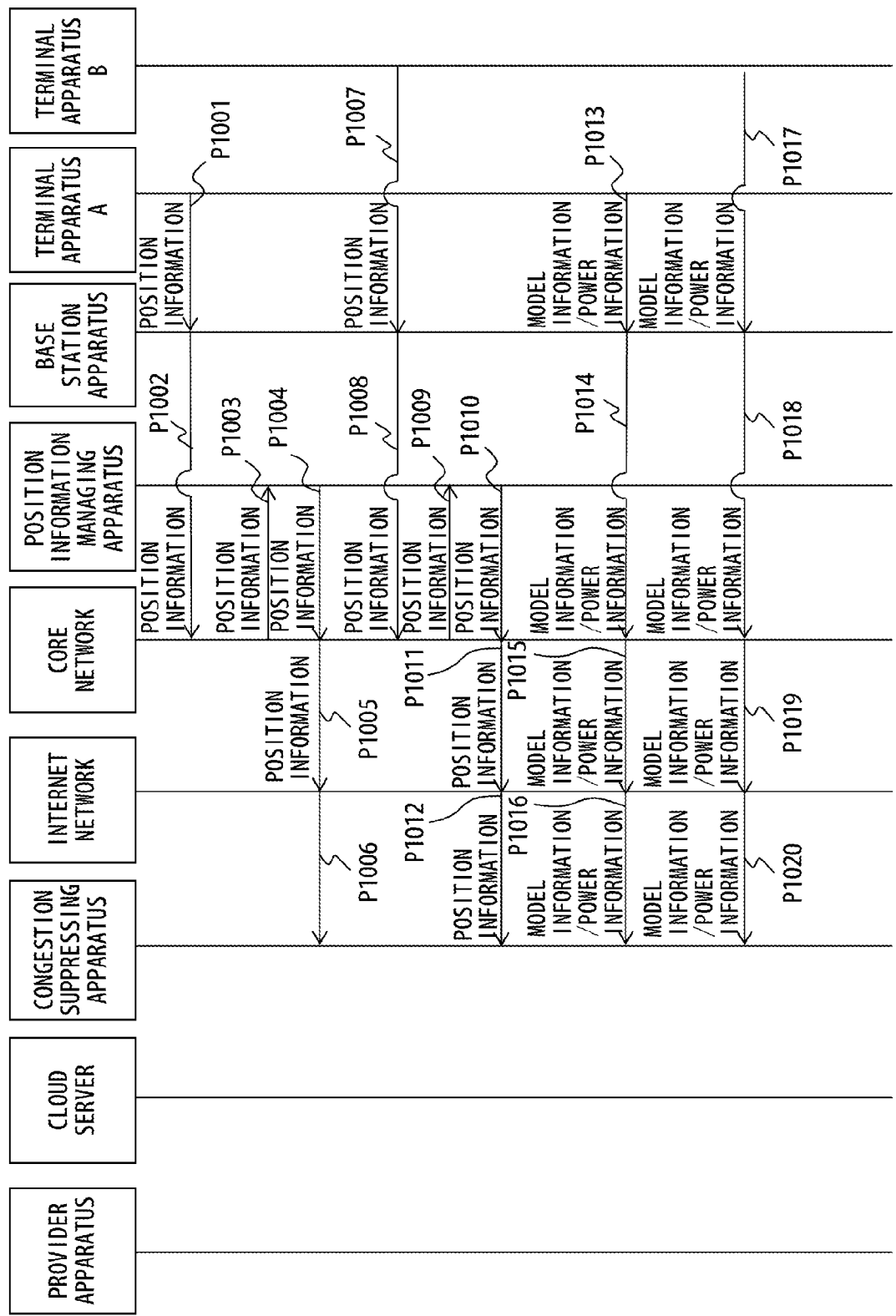
FIG. 8 is an exemplary sequence diagram of a process of obtaining position information, the process being performed by a radio access system in accordance with an embodiment.

First, the congestion suppressing apparatus 60 obtains position information of a terminal apparatus 110 included in the radio access system 1. The congestion suppressing apparatus 60 may obtain model information and/or power information of the terminal apparatus 110 included in the radio access system 1. FIG. 8 is an exemplary sequence diagram of a process of obtaining position information, the process being performed by a radio access system in accordance with an embodiment.

In FIG. 8, terminal apparatuses A and B are examples of terminal apparatus 110 included in the radio access system 1. Each terminal apparatus 110 is connected to abase station apparatus from which a broadcast signal with a satisfactory radio quality is received from among the neighboring base station apparatuses of the terminal apparatus 110. The base station apparatus to which a connection is established may be any of the first base station apparatus 70, the second base station apparatus 90, or the access point apparatus 100. When a connection to the first base station apparatus 70 is established, signals are transmitted and received between the terminal apparatus 110 and the core network 50 via the connected first base station apparatus 70 and the first-base-station controlling apparatuses 80.

The terminal apparatus A transmits position information of the terminal apparatus A to the position information managing apparatus 30 via the core network 50 and the base station apparatus to which the terminal apparatus A has been connected (processes P1001-P1003). The position information managing apparatus 30 records the received position information in the position information management database 31A. The position information managing apparatus 30 also transmits the received position information to the congestion suppressing apparatus 60 via the core network 50 and the Internet network 40 (processes P1004-P1006). The position information managing unit 61 of the congestion suppressing apparatus 60 receives the position information transmitted from the position information managing apparatus 30 via the IP-IF unit 64, and records the received position information in the position information management database 61A.

In addition, the terminal apparatus B transmits position information of the terminal apparatus B to the position information managing apparatus 30 via the core network 50 and the base station apparatus to which the terminal apparatus B has been connected (processes P1007-P1009). The position information managing apparatus 30 records the received position information in the position information management database 31A. The position information managing apparatus 30 also transmits the received position information to the congestion suppressing apparatus 60 via the core network 50 and the Internet network 40 (processes P1010-P1012). The position information managing unit 61 of the congestion suppressing apparatus 60 receives the position information transmitted from the position information managing apparatus 30 via the IP-IF unit 64, and records the received position information in the position information management database 61A.

The terminal apparatus A may transmit model information and/or power information of the terminal apparatus A to the congestion suppressing apparatus 60 via the base station apparatus to which the terminal apparatus A has been connected, the core network 50, and the Internet network 40 (processes P1013-P1016). The position information managing unit 61 of the congestion suppressing apparatus 60 may receive and hold the model information and/or power information transmitted from the terminal apparatus A via the IP-IF unit 64. The terminal apparatus B may transmit model information and/or power information of the terminal apparatus B to the congestion suppressing apparatus 60 via the base station apparatus to which the terminal apparatus B has been connected, the core network 50, and the Internet network 40 (processes P1017-P1020). The position information managing unit 61 of the congestion suppressing apparatus 60 may receive and hold the model information and/or power information transmitted from the terminal apparatus B via the IP-IF unit 64.

It should be noted that the sequence of the process of obtaining position information illustrated in FIG. 8 is an example. For example, each of the terminal apparatuses 110 such as the terminal apparatuses A and B may transmit a radio quality measurement signal, e.g., Measurement Report, into which the position information of the terminal apparatus 110 has been incorporated. The terminal apparatus 110 may transmit model information and/or power information of the terminal apparatus 110 together with position information.

Performing the process of obtaining position information as described above causes the position information managing unit 61 to obtain position information indicating the current position of each terminal apparatus 110 included in the radio access system 1. The position information managing unit 61 also obtains model information and/or power information of each terminal apparatus 110 included in the radio access system 1. The position information managing unit 61 obtains area information such as a map or building information from a map-data providing server and/or an area quality server and holds the obtained area information.

Figure 9A:
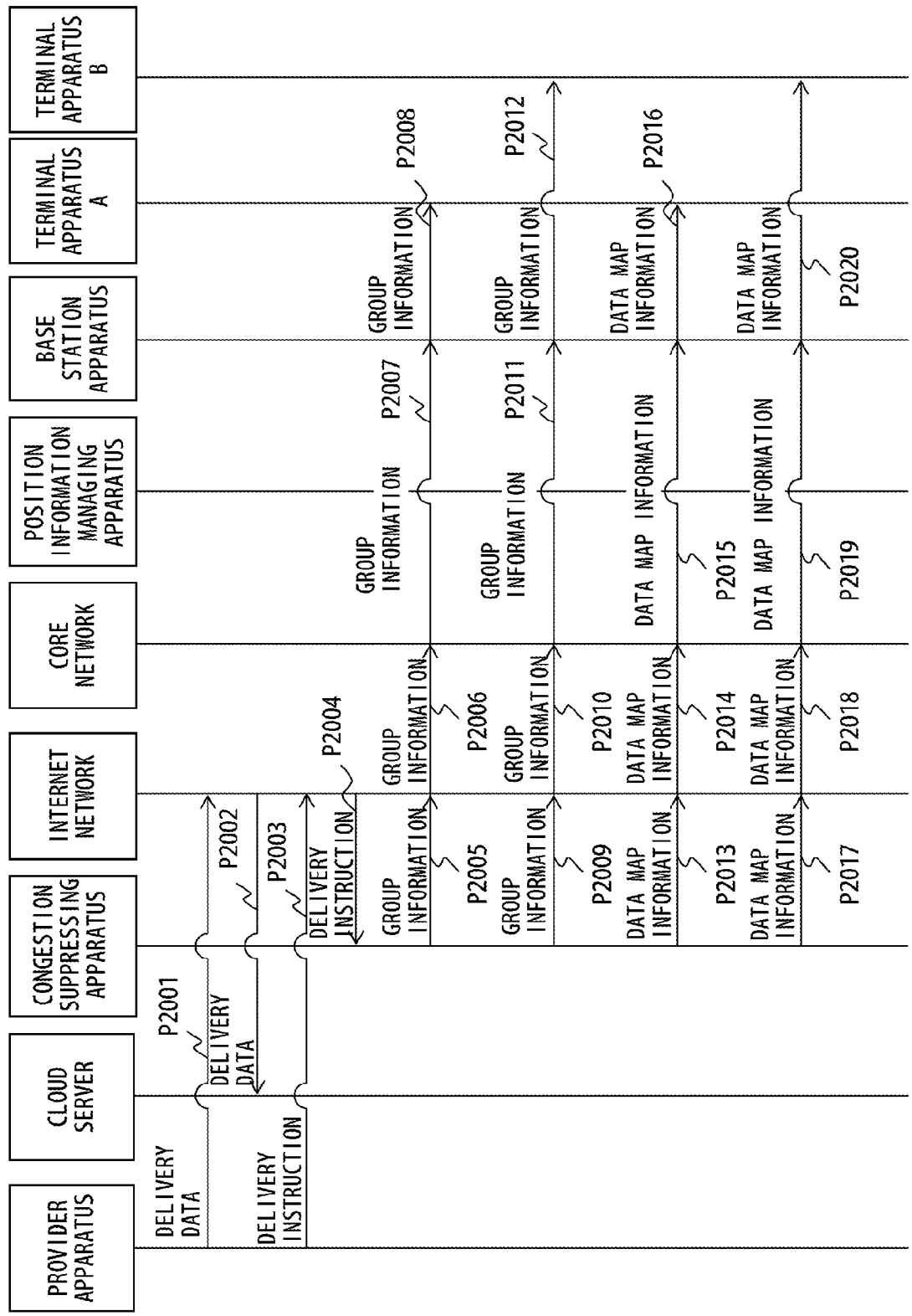
FIG. 9A is an exemplary sequence diagram of data delivery performed by a radio access system in accordance with an embodiment.
Figure 9B:
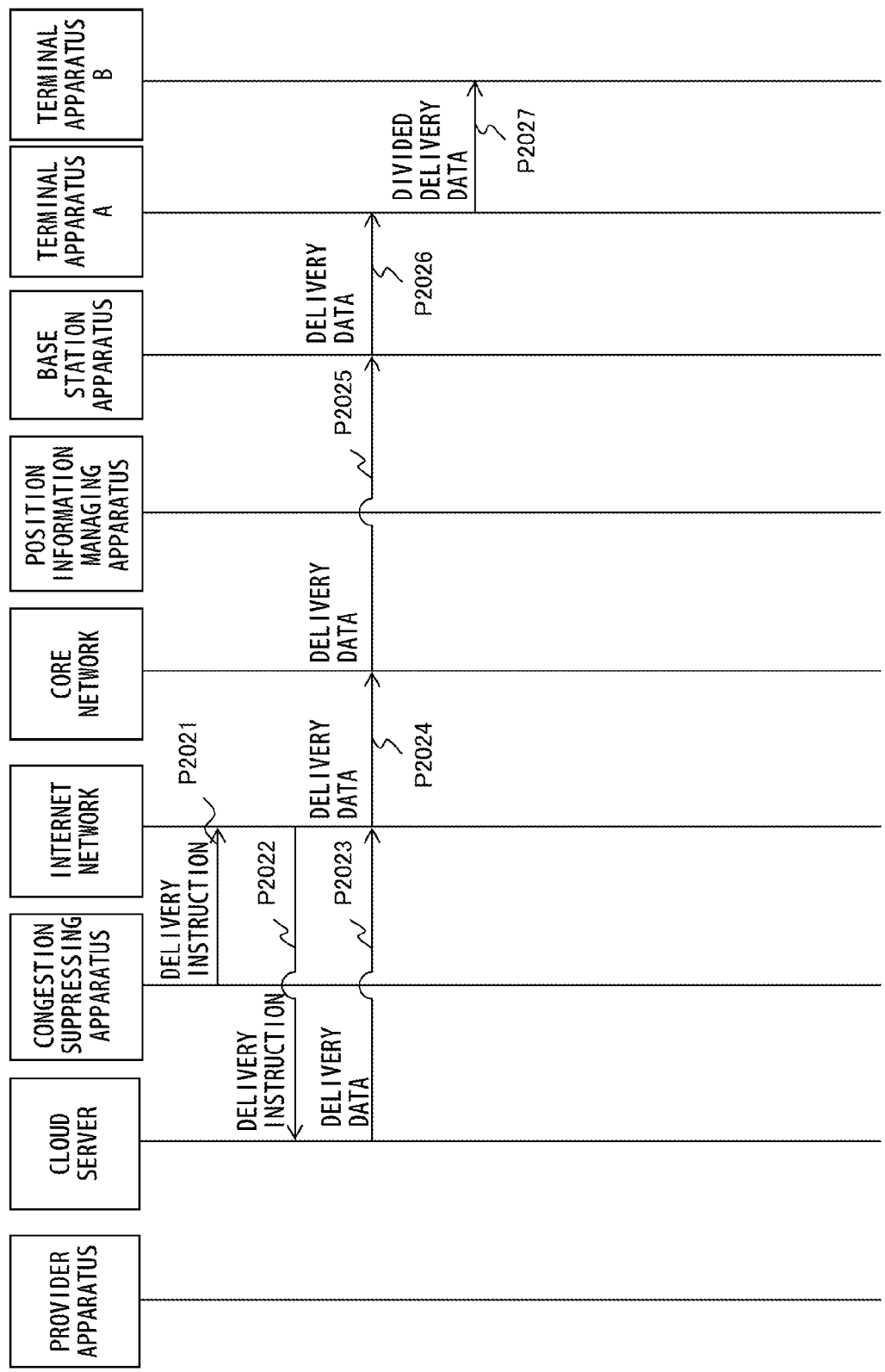
FIG. 9B is an exemplary sequence diagram of data delivery performed by a radio access system in accordance with an embodiment.

FIGS. 9A and 9B are exemplary sequence diagrams of data delivery performed by a radio access system in accordance with an embodiment. The provider apparatus 10 receives and holds delivery data 11A and delivery data 11B from an information processing apparatus of a user. The provider apparatus 10 transmits delivery data 11A to the cloud server 20 via the Internet network 40 and uploads delivery data 11A onto the cloud server 20 (processes P2001-P2002). The cloud server 20 records the received delivery data 11A in the delivery data database 21A.

The provider apparatus 10 gives, over the Internet network 40, the congestion suppressing apparatus 60 an instruction to deliver delivery data 11A (processes P2003-P2004). The delivery instruction transmitted from the provider apparatus 10 includes delivery data information 11B. Delivery data information 11B includes the data size of delivery data 11A and information on a terminal apparatus 110 to which delivery data 11A is to be delivered.

Figure 11:
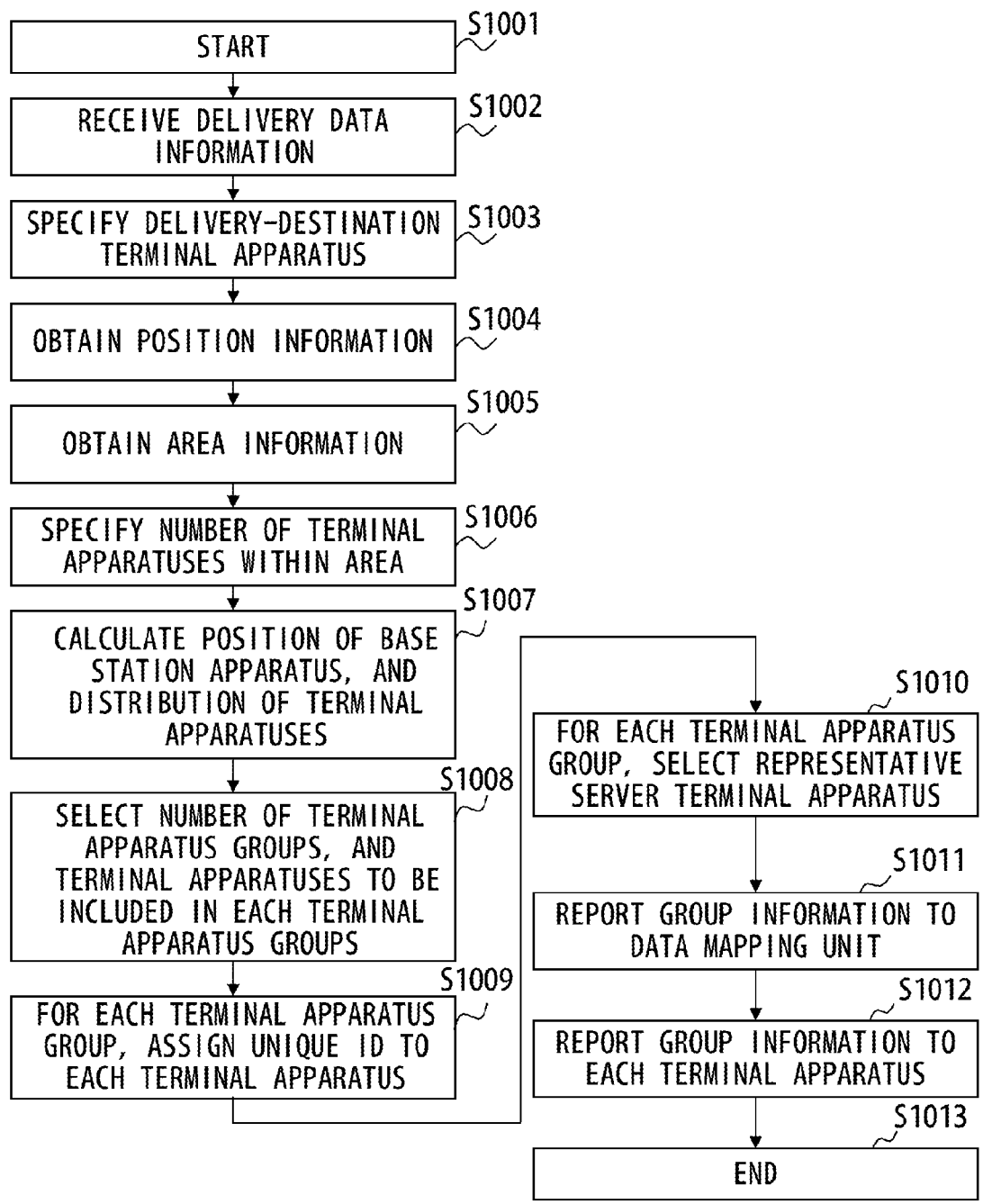
FIG. 11 is an exemplary flow diagram of a process of generating group information, the process being performed by a congestion suppressing apparatus in accordance with an embodiment.
Figure 12:
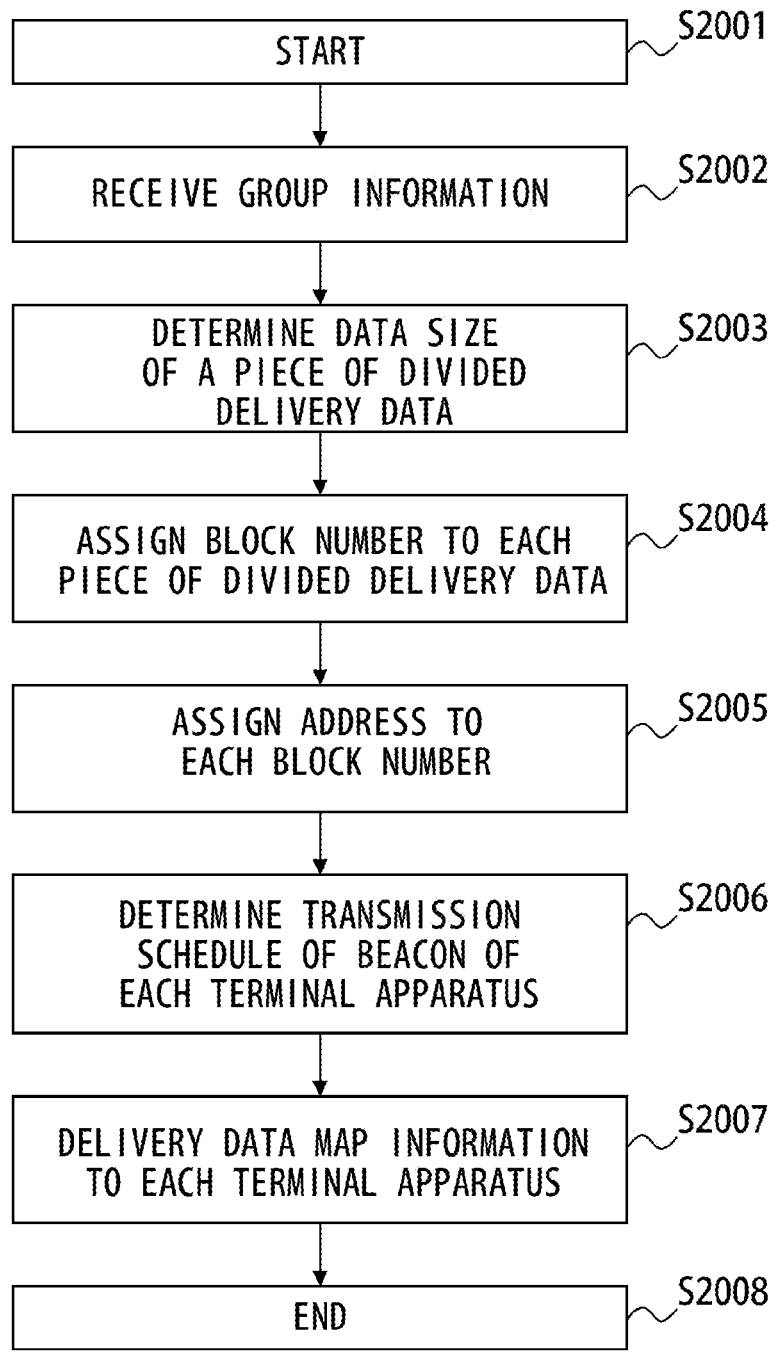
FIG. 12 is an exemplary flow diagram of a process of generating data map information, the process being performed by a congestion suppressing apparatus in accordance with an embodiment.

The congestion suppressing apparatus 60 receives from the provider apparatus 10 an instruction to deliver delivery data 11A. Then, the congestion suppressing apparatus 60 generates delivery information for delivering delivery data 11A from the cloud server 20 to a delivery-destination terminal apparatus 110. The generated delivery information includes group information and data map information. With reference to FIGS. 10-12, the following will describe a process of generating delivery information performed by the congestion suppressing apparatus 60.

FIG. 10 is an explanatory diagram of an exemplary terminal apparatus group for which data delivery is performed in accordance with an embodiment. In the example depicted in FIG. 10, 150 terminal apparatuses 110 with terminal apparatus numbers 1-150 are present within a particular area A. The particular area A is, for example, an event site, particular building, or station yard. In the example depicted in FIG. 10, the two base station apparatuses such as base station apparatuses A and B cover communications within the particular area. Alternatively, when, as the example of FIG. 10 indicates, the two base station apparatuses cover communications within the particular area, a terminal apparatus 110 may be connected to the base station apparatus A, and another terminal apparatus 110 may be connected to the base station apparatus B. When a communication area covered by the base station apparatus A at least partially overlaps a communication area covered by the base station apparatus B, a terminal apparatus 110 may be connected to the base station apparatus A for a satisfactory radio quality, and another terminal apparatus 110 may be connected to the base station apparatus B for a satisfactory radio quality. First and second base station apparatuses may each be any of the first base station apparatus 70, the second base station apparatus 90, or the access point apparatus 100. FIG. 10 depicts an example, and any number of terminal apparatuses 110 may be present within the particular area. Communications within the particular area may be covered by one base station apparatus, or may be covered by three or more base station apparatuses.

FIG. 11 is an exemplary flow diagram of a process of generating group information, the process being performed by a congestion suppressing apparatus in accordance with an embodiment. When a processing sequence for generating delivery information starts (step S1001), the data mapping unit 63 receives a delivery instruction transmitted from the provider apparatus 10 via the IP-IF unit 64 (step S1002). In the example depicted in FIG. 10A, a delivery instruction to deliver data to terminal apparatuses 110 including the terminal apparatuses 110 with terminal apparatus numbers 1-150 is received.

The data mapping unit 63 refers to the delivery data information 11B included in the received delivery instruction and obtains identification information of terminal apparatuses 110 to which delivery data 11A is to be delivered. Using the obtained identification information of the terminal apparatuses 110, the data mapping unit 63 specifies the delivery-destination terminal apparatuses 110 (step S1003). Terminal apparatuses 110 including the terminal apparatuses 110 with terminal apparatus numbers 1-150 are specified in the example of FIG. 10.

The data mapping unit 63 transmits a transmission request for position information of the delivery-destination terminal apparatuses 110 to the position information managing unit 61. Upon receipt of the transmission request, the position information managing unit 61 obtains, from the position information management database, the position information of the terminal apparatuses 110 to which delivery data 11A is to be delivered, and transmits the obtained position information to the grouping unit 62 and the data mapping unit 63. The grouping unit 62 and the data mapping unit 63 receive the position information transmitted from the position information managing unit 61, i.e., obtain the position information of the delivery-destination terminal apparatuses 110 (step S1004). Position information with terminal apparatuses 110 including the terminal apparatuses 110 with terminal apparatus numbers 1-150 is obtained in the example of FIG. 10.

The grouping unit 62 transmits, to the position information managing unit 61, a transmission request for area information of an area that includes positions indicated by the position information of the delivery-destination terminal apparatuses 110. The position information managing unit 61 transmits, to the grouping unit 62, the area information of the area that includes the positions of the delivery-destination terminal apparatuses 110. The grouping unit 62 receives the area information transmitted from the position information managing unit 61, i.e., obtains the area information of the area that includes the positions of the delivery-destination terminal apparatuses 110 (step S1005). The area information of a particular area A is obtained in the example of FIG. 10.

Using the obtained area information, the grouping unit 62 specifies the number of delivery-destination terminal apparatuses 110 within the particular area (step S1006). The number of terminal apparatuses 110 is 150 in the example of FIG. 10.

The grouping unit 62 specifies a base station apparatus that covers communications performed by the delivery-destination terminal apparatuses 110 located within the particular area. One or more base station apparatuses may be specified. In the example of FIG. 10, two base station apparatuses (base station apparatuses A and B) are specified.

The grouping unit 62 calculates the position of the specified base station apparatus and the number of terminal apparatuses 110 present within the communication area of the specified base station apparatus (step S1007). Information on base station apparatuses, e.g., the position of each of the base station apparatuses included in the radio access system 1, covered communication areas, and processing capacities, is set in advance within the congestion suppressing apparatus 60. The grouping unit 62 may obtain the set information on the base station apparatuses. As the processing capacity of each base station apparatus, a predetermined value is set in advance according to a memory capacity and the number of terminal apparatuses 110 that the base station apparatus can accommodate.

The grouping unit 62 selects the number of terminal apparatus groups to which the delivery-destination terminal apparatuses 110 located within the particular area are to belong, and selects delivery-destination terminal apparatuses 110 to be included in each of the terminal apparatus groups (step S1008). In one possible example, using the number of delivery-destination terminal apparatuses 110 located within a particular area, the processing capacity of a specified base station apparatus, and a requested delivery rate, the grouping unit 62 selects the number of terminal apparatus groups and terminal apparatuses 110 to be included in each of the terminal apparatus groups. The requested delivery rate is a delivery rate requested to be used in delivering delivery data 11A to all of the delivery-destination terminal apparatuses 110 located within the particular area.

When, for example, the number of delivery-destination terminal apparatuses 110 located within the particular area is greater than a predetermined value, the grouping unit 62 selects a plurality of terminal apparatus groups and selects terminal apparatuses 110 to be included in each of the selected terminal apparatus groups. When it is determined that the processing capacity of the specified base station apparatus is low relative to the number of delivery-destination terminal apparatuses 110 located within the particular area, the grouping unit 62 selects a plurality of terminal apparatus groups and selects terminal apparatuses 110 to be included in each of the selected terminal apparatus groups. In addition, when it is determined that the requested delivery rate for delivery data 11A is high, the grouping unit selects a plurality of terminal apparatus groups and selects terminal apparatuses 110 to be included in each of the selected terminal apparatus groups.

In the example of FIG. 10, one terminal apparatus group G is selected, and 150 terminal apparatuses 110 to be included in the terminal apparatus group G are selected.

The grouping unit 62 assigns a unique group identifier to each of the selected terminal apparatus groups. For each of the selected terminal apparatus groups, the grouping unit 62 assigns a unique terminal apparatus number to each terminal apparatus 110 included in the terminal apparatus group (step S1009).

For each of the selected terminal apparatus groups, the grouping unit 62 selects one or more representative server terminal apparatuses from the terminal apparatuses 110 included in the terminal apparatus group (step S1010).

In one possible example, the grouping unit 62 selects the number of representative server terminal apparatuses for the terminal apparatus group in accordance with the scale of the terminal apparatus group and a requested delivery rate of delivery data 11A. When the requested delivery rate of the delivery data is high, the grouping unit 62 selects a plurality of representative server terminal apparatuses for the terminal apparatus group. On the other hand, when the requested delivery rate of delivery data 11A is low, the grouping unit 62 may select one representative server terminal apparatus for the terminal apparatus group. However, when it is determined that the delivery rate will be lower than the requested delivery rate due to a large number of terminal apparatuses 110 being included in the terminal apparatus group, the grouping unit 62 may select a plurality of representative server terminal apparatuses for the terminal apparatus group.

In one possible example, the grouping unit 62 obtains a bandwidth use situation of a specified base station apparatus and selects the number of representative server terminal apparatuses for the terminal apparatus group in accordance with the bandwidth use situation of the base station apparatus and the scale of the terminal apparatus group. When the terminal apparatus group includes a small number of terminal apparatuses 110, the grouping unit 62 selects one representative server terminal apparatus from the terminal apparatus group. Meanwhile, when the terminal apparatus group includes a large number of terminal apparatuses 110, a plurality of terminal apparatuses may use the bandwidth of the base station apparatus, leading to a decrease in the rate of communication from the base station apparatus to the plurality of terminal apparatuses 110. However, the grouping unit 62 selects a plurality of representative server terminal apparatuses from the terminal apparatus group when it is determined that using a plurality of representative server apparatuses will increase the delivery rate within the terminal apparatus group and will shorten the time before all of the terminal apparatuses 110 completely download delivery data 11A.

For example, the grouping unit 62 may use model information of each terminal apparatus 110 so as to select a terminal apparatus 110 of a model for high-speed communication as a representative server terminal apparatus from the terminal apparatuses 110 included in the terminal apparatus group. The grouping unit 62 may use power information of each terminal apparatus 110 so as to select a terminal apparatus 110 connected to an external power source or whose battery is not easily drained as a representative server terminal apparatus from the terminal apparatuses 110 included in the terminal apparatus group. The grouping unit 62 may sample position information of terminal apparatuses 110 at certain time intervals so as to select a terminal apparatus 110 that moves a short distance, and is thus not likely to perform handover, as a representative server terminal apparatus from the terminal apparatuses 110 included in the terminal apparatus group.

In the example of FIG. 10, the terminal apparatus 110 with terminal apparatus number 1 and the terminal apparatus 110 with terminal apparatus number 10 are selected from the terminal apparatus group G as representative server terminal apparatuses.

The grouping unit 62 defines the area number, total number of terminals, group identifier, and terminal apparatus numbers of each terminal apparatus group as group information of the terminal apparatus group, and records the group information of each terminal apparatus in the group information database 62A. In the example of FIG. 10, the identification number of the particular area A, the total number of terminal apparatuses 110, i.e., 150, the identifier of the terminal apparatus group G, and terminal apparatus numbers 1-150 are recorded as group information of the terminal apparatus group G.

The grouping unit 62 reports group information to the data mapping unit 63 (step S1011). The data mapping unit 63 transmits the reported group information via the IP-IF unit 64 to each terminal apparatus 110 included in the terminal apparatus group corresponding to the group information (step S1012), and the processing sequence for generating group information ends (step S1013).

In the aforementioned process of generating group information, the congestion suppressing apparatus 60 transmits group information corresponding to the terminal apparatus group that includes the terminal apparatus A to the terminal apparatus A via the Internet network 40, the core network 50, and the base station apparatus to which the terminal apparatus A is connected (processes P2005-P2008). The congestion suppressing apparatus 60 also transmits group information corresponding to the terminal apparatus group that includes the terminal apparatus B to the terminal apparatus B via the Internet network 40, the core network 50, and the base station apparatus to which the terminal apparatus B is connected (processes P2009-P2012). In the example of FIG. 10, the terminal apparatuses A and B are terminal apparatuses 110 included in the same terminal apparatus group (terminal apparatus group G).

Performing the process of generating group information triggers a process of generating data map information. FIG. 12 is an exemplary flow diagram of a process of generating data map information, the process being performed by a congestion suppressing apparatus in accordance with an embodiment.

When a processing sequence for generating data map information starts (step S2001), the data mapping unit 63 receives group information transmitted from the grouping unit 62 (step S2002). Using the data size of delivery data 11A and the number of terminal apparatuses 110 included in the terminal apparatus group indicated by the received group information, the data mapping unit 63 determines a division size of delivery data 11A (step S2003). In one possible example, the data mapping unit 63 determines the division size of delivery data 11A by dividing the data size of delivery data 11A by a multiple of the number of terminal apparatuses 110 (an arbitrary multiple that is one or greater). Allowing divided delivery data 11A to be transmitted and received between the terminal apparatuses 110 within the terminal apparatus group may shorten the delivery cycle between terminal apparatuses 110, thereby shortening the wait time for transmission and/or reception of delivery data 11A.

The data mapping unit 63 generates a plurality of pieces of divided delivery data by dividing delivery data 11A in accordance with the determined division size. The data mapping unit 63 assigns a unique block number to each piece of divided delivery data (step S2004). The block numbers each indicate apiece of divided delivery data included in delivery data 11A.

The data mapping unit 63 creates data map information for delivery data 11A by assigning a data address indicating a position within delivery data 11A to each piece of divided delivery data identified by a block number (step S2005). The congestion suppressing apparatus 60 adds terminal apparatus information to the created data map information. Terminal apparatus information includes the terminal apparatus number of the terminal apparatus 110 to which data map information is to be transmitted. Terminal apparatus information also includes information indicating whether the terminal apparatus 110 is a representative server terminal apparatus.

The data mapping unit 63 determines the transmission schedule of a beacon signal from each terminal apparatus 11 included in the terminal apparatus group (step S2006). The beacon signal is a signal that is periodically transmitted to report to neighboring terminal apparatuses 110 that the terminal apparatus 110 can receive delivery data 11A. The data mapping unit 63 determines the transmission schedule of beacon signals in a manner such that each of the terminal apparatuses 110 can transmit the beacon signal at a different unique timing affiliated with group information and based on a time-sharing scheme.

The data mapping unit 63 transmits the data map information to which terminal apparatus information has been added to each terminal apparatus 110 within the terminal apparatus group via the IP-IF unit 64 together with the determined transmission schedule of beacon signals (step S2007). Then, the processing sequence for generating data map information ends (step S2008).

In the aforementioned process of generating data map information, the congestion suppressing apparatus 60 transmits data map information corresponding to the terminal apparatus group that includes the terminal apparatus A to the terminal apparatus A via the Internet network 40, the core network 50, and the base station apparatus to which the terminal apparatus A is connected (processes P2013-P2016). The congestion suppressing apparatus 60 also transmits data map information corresponding to the terminal apparatus group that includes the terminal apparatus B to the terminal apparatus B via the Internet network 40, the core network 50, and the base station apparatus to which the terminal apparatus B is connected (processes P2017-P2020).

The data mapping unit 63 of the congestion suppressing apparatus 60 gives the cloud server 20, via the Internet network 40, an instruction to deliver delivery data 11A to a representative server terminal apparatus included in the terminal apparatus group. When, for example, the terminal apparatus A is a representative server terminal apparatus and the terminal apparatus B is not a representative server terminal apparatus, the congestion suppressing apparatus 60 instructs the cloud server 20 to deliver delivery data 11A to the terminal apparatus A (processes P2021-P2022).

In accordance with the received delivery instruction, the cloud server 20 transmits the delivery data 11A stored in the delivery data database 21A to the representative server terminal apparatus via the Internet network 40, the core network 50, and the base station apparatus to which the server terminal apparatus is connected. In the of FIG. 9B, the cloud server 20 transmits delivery data 11A to the terminal apparatus A (processes P2023-P2026).

When the representative server terminal apparatus included in the terminal apparatus group receives delivery data 11A, the received delivery data 11A is delivered from the representative server terminal apparatus to each terminal apparatus 110 within the terminal apparatus group. In particular, pieces of divided delivery data obtained by dividing the received delivery data 11A are transmitted and received between the terminal apparatuses 110 within the terminal apparatus group, with the result that each of the terminal apparatuses 110 within the terminal apparatus group downloads delivery data 11A. In the example depicted in FIG. 9, the terminal apparatus A transmits pieces of divided delivery data to the terminal apparatus B, i.e., another terminal apparatus 110 which belongs to the same terminal apparatus group as the terminal apparatus A (process P2027). The terminal apparatus B receives pieces of divided delivery data transmitted from the terminal apparatus A, and downloads delivery data 11A by combining the pieces of received divided delivery data. In the example of FIG. 10, as indicated by arrows representing diffusion starting from the terminal apparatus 110 with terminal apparatus number 1 to other terminal apparatuses 110, the delivery data 11A received by the terminal apparatus 110 with terminal apparatus number 1 is divided into pieces of divided delivery data, which are then transmitted and received between neighboring terminal apparatuses 110. In addition, as indicated by arrows representing diffusion starting from the terminal apparatus 110 with terminal apparatus number 10 to other terminal apparatuses 110, the delivery data 11A received by the terminal apparatus 110 with terminal apparatus number 10 is divided into pieces of divided delivery data, which are then transmitted and received between neighboring terminal apparatuses 110. In this way, the delivery data 11A received by each of the individual terminal apparatuses 110 with terminal apparatus numbers 1 and 10 is delivered to the terminal apparatuses 110 within the terminal apparatus group G.

With reference to FIGS. 13-15, the following will describe an exemplary process of obtaining delivery data performed by each terminal apparatus 110 included in a terminal apparatus group. FIG. 13 is an exemplary flow diagram of a process of obtaining delivery data, the process being performed by a terminal apparatus in accordance with an embodiment.

When a processing sequence for obtaining delivery data starts (step S3001), the delivery information receiving unit 112 waits for reception of data map information and group information transmitted from the congestion suppressing apparatus 60 and determines whether data map information and group information have been received (step S3002). As described above with reference to FIG. 9A, data map information and group information may each be transmitted at a different timing from the congestion suppressing apparatus 60 to a terminal apparatus 110. As described above with reference to FIG. 12, terminal apparatus information is added to data map information and includes information indicating the terminal apparatus number of, and a representative server terminal apparatus for, the terminal apparatus 110 for which the data map information has been received. A unique transmission schedule of a beacon signal of the terminal apparatus 110 may be transmitted together with data map information.

When it is determined that data map information and group information have been received via the radio communication unit 115 ("YES" in step S3002), the delivery information receiving unit 112 transmits the received data map information and group information to the delivery data obtaining unit 113. The delivery data obtaining unit 113 receives the group information transmitted from the delivery information receiving unit 112, and stores the received group information in the group information database 113A. The delivery data obtaining unit 113 also receives the data map information transmitted from the delivery information receiving unit 112, and stores the received data map information in the data map information database 113B (step S3003).

Data map information is stored in the data map information database 113B in, for example, the table format depicted in FIG. 4. In the data map information stored in the table format, each block corresponding to a piece of divided delivery data specified by an address is flagged to indicate whether the terminal apparatus 110 has received the piece of divided delivery data.

The delivery data obtaining unit 113 obtains from the delivery information receiving unit 112 the transmission schedule of a beacon signal received together with data map information. In accordance with the obtained delivery schedule, the delivery data obtaining unit 113 transmits the beacon signal, i.e., a signal that includes the terminal apparatus number of the terminal apparatus 110, to a neighboring terminal apparatus 110 via the inter-terminal radio communication unit 116 (step S3004).

The delivery data obtaining unit 113 receives a beacon signal transmitted at a unique timing from a neighboring terminal apparatus 110 via the inter-terminal radio communication unit 116. The delivery data obtaining unit 113 refers to the terminal apparatus number included in the received beacon signal and specifies a terminal apparatus 110 located in the vicinity of the terminal apparatus 110 (step S3005).

In accordance with the terminal apparatus information added to the received data map information, the delivery data obtaining unit 113 determines whether the terminal apparatus 110 that has performed the processing sequence for obtaining delivery data is a representative server terminal apparatus (step S3006).

When it is determined that the terminal apparatus 110 is not a representative server terminal apparatus ("NO" in step S3006), the delivery data obtaining unit 113 performs a client process (step S3007). The client process is a process wherein the terminal apparatus 110 obtains, from a neighboring terminal apparatus, the divided delivery data held by the neighboring terminal apparatus 110. Divided delivery data is data obtained by dividing the delivery data 11A downloaded by a representative server terminal apparatus in accordance with a delivery rule indicated by data map information. Details of the client process will be described hereinafter with reference to FIG. 15.

When it is determined that the terminal apparatus 110 is a representative server terminal apparatus ("YES" in step S3006), the delivery information receiving unit 112 starts to download the delivery data 11A transmitted from the cloud server 20 in accordance with a transmission instruction from the congestion suppressing apparatus 60 (step S3008). That is, the delivery information receiving unit 112 stores the delivery data 11A transmitted from the cloud server 20 in the delivery data storage unit 114.

When the delivery data 11A transmitted from the cloud server 20 is stored in the delivery data storage unit 114, i.e., when the download of the delivery data 11A is completed ("YES" in S3009), the delivery information receiving unit 112 reports the completion of the download of delivery data 11A to the delivery data obtaining unit 113. The delivery data obtaining unit 113 flags every block within the data map information recorded in the data map information database 113B in such a manner as to indicate that the terminal apparatus 110 has received divided delivery data. The delivery data obtaining unit 113 performs a server process (step S3010). The server process is a process wherein the terminal apparatus 110 transmits the divided delivery data held by the terminal apparatus 110 to a neighboring terminal apparatus. Details of the server process will be described with reference to FIG. 14.

FIG. 14 is an exemplary flow diagram of a server process performed by a terminal apparatus in accordance with an embodiment. FIG. 15 is an exemplary flow diagram of a client process performed by a terminal apparatus in accordance with an embodiment.

A representative server terminal apparatus may perform the server process depicted in FIG. 14. A server apparatus 110 that has performed a client process may perform the server process depicted in FIG. 14. A terminal apparatus 110 that is not a representative server terminal apparatus may perform the client process depicted in FIG. 15. In the following descriptions, a terminal apparatus 110 that performs the server process will be referred to as a server terminal apparatus, and a terminal apparatus 110 that performs the client process will be referred to as a client terminal apparatus. A terminal apparatus 110 that is not a representative server terminal apparatus may be a server terminal apparatus that performs the server process depicted in FIG. 14, or may be a client terminal apparatus that performs the client process depicted in FIG. 15.

First, with reference to FIG. 14, a description will be given of an exemplary server process performed by a terminal apparatus 110 in accordance with an embodiment.

When the terminal apparatus 110 serves as a server terminal apparatus to start a server processing sequence (step S4001), the delivery data obtaining unit 113 of the terminal apparatus 110 transmits a broadcast signal to neighboring terminal apparatuses 110 via the inter-terminal radio communication unit 116 and establishes links to the neighboring terminal apparatuses 110 (step S4002). The broadcast signal transmitted from the delivery data obtaining unit 113 includes the terminal apparatus numbers of the neighboring terminal apparatuses 110 and includes an instruction to establish a link to the terminal apparatus 110 that is a server terminal apparatus. The terminal apparatuses 110 to which the links have been established serve as client terminal apparatuses.

The delivery data obtaining unit 113 receives, via the inter-terminal radio communication unit 116, information on a piece of divided delivery data that has not been received by a client terminal apparatus to which the link has been established (step S4003). Information on a piece of divided delivery data that has not been received is transmitted from each client terminal apparatus to which the link has been established.

As described above with reference to FIG. 10, the terminal apparatuses 110 included in a terminal apparatus group other than the representative server terminal apparatus each obtain delivery data 11A by exchanging pieces of divided delivery data with neighboring terminal apparatuses 110. Hence, the client terminal apparatuses that have established a link to the terminal apparatus 110 may include a client terminal apparatus that has not received a piece of divided delivery data from a neighboring server terminal apparatus. Information on a piece of divided delivery data that has not been received by a client terminal apparatus may be, for example, a unique address assigned to the piece of divided delivery data or the block number of the piece of divided delivery data.

According to information on divided delivery data that has not been received, the delivery data obtaining unit 113 determines whether a piece of transmittable divided delivery data is stored in the delivery data storage unit 114 (step S4004). Specifically, the delivery data obtaining unit 113 refers to the data map information recorded in the data map information database 113B. Then, the delivery data obtaining unit 113 determines whether a block corresponding to a piece of divided delivery data that has not been received by a client terminal apparatus to which a link has been established has been flagged to indicate that the terminal apparatus 110 has received the piece of divided delivery data.

When it is determined that a piece of transmittable divided delivery data is stored in the delivery data storage unit 114 ("YES" in step S4004), the delivery data obtaining unit 113 obtains the piece of transmittable divided delivery data from the delivery data storage unit 114. The delivery data obtaining unit 113 transmits, via the inter-terminal radio communication unit 116, the obtained piece of divided delivery data to a client terminal apparatus to which a link has been established (step S4005).

When the transmission of the piece of transmittable divided delivery data is completed ("YES" in step S4006), the delivery data obtaining unit 113 searches for a neighboring terminal apparatus 110 with which communication can be established (step S4007). The user of each terminal apparatus 110 may move to another position, and hence various terminal apparatuses 110 could be a neighboring terminal apparatus 110 with which the terminal apparatus 110 can communicate. Accordingly, in step 54007, the delivery data obtaining unit 113 again receives a beacon signal transmitted from a neighboring terminal apparatus 110 so as to specify the neighboring terminal apparatus 110 again. Then, the delivery data obtaining unit 113 returns to the process of step S4002.

When it is determined that a piece of transmittable divided delivery data is not stored in the delivery data storage unit 114 ("NO" in step S4004), the delivery data obtaining unit 113 transmits a disconnection request for the link to the client terminal apparatus to which a link has been established. The delivery data obtaining unit 113 determines whether all of the pieces of divided delivery data have completely been received (step S4008). Specifically, the delivery data obtaining unit 113 checks whether every block of the data map information recorded in the data map information database 113B has been flagged to indicate that the terminal apparatus 110 has received a piece of divided delivery data corresponding to the block. When, for example, the terminal apparatus 110 that performs the server process series is a representative server terminal apparatus, every block of data map information is flagged to indicate that the terminal apparatus 110 has received a piece of divided delivery data corresponding to the block.

When it is determined that all of the pieces of divided delivery data have been received ("YES" in step S4008), the terminal apparatus 110 ends the processing sequence for obtaining delivery data started in step S3001 (step S4009). When it is determined that some pieces of divided delivery data have not been received ("NO" in step S4008), the terminal apparatus 110, i.e., a terminal apparatus 110 that has served as a server terminal apparatus to perform the server processing sequence, shifts to a client process (step S4010).

With reference to FIG. 15, the following will describe an exemplary client process performed by a terminal apparatus 110 in accordance with an embodiment.

When a terminal apparatus 110 serves as a client terminal apparatus to start a client processing sequence (step S5001), the delivery data obtaining unit 113 of the terminal apparatus 110 waits for access from a neighboring terminal apparatus 110 operated as a server terminal apparatus (step S5002).

The delivery data obtaining unit 113 receives a broadcast signal transmitted from the server terminal apparatus via the inter-terminal radio communication unit 116, and, in accordance with the received broadcast signal, establishes a link to the server terminal apparatus via the inter-terminal radio communication unit 116 (step S5003). The delivery data obtaining unit 113 refers to the flag of each block within the data map information recorded in the data map information database 113B so as to identify a piece of divided delivery data that has not been received. The delivery data obtaining unit 113 transmits, via the inter-terminal radio communication unit 116, information on the piece of divided delivery data that has not been received to the server terminal apparatus to which a link has been established (step S5004). The information on the piece of divided delivery data that has not been received may be a unique address assigned to the piece of divided delivery data, or may be the block number the piece of divided delivery data.

When the piece of divided delivery data that has not been received is not stored in the server terminal apparatus to which a link has been established ("NO" in step S5005), the delivery data obtaining unit 113 receives a link disconnection request transmitted from the server terminal apparatus to which a link has been established (step S5006). The delivery data obtaining unit 113 causes the inter-terminal radio communication unit 116 to disconnect the established link to the server terminal apparatus (step S5007) and returns to the process of step S5002.

When the piece of divided delivery data that has not been received is stored in the server terminal apparatus to which a link has been established ("YES" in step S5005), the delivery data obtaining unit 113 receives, from the server terminal apparatus to which a link has been established and via the inter-terminal radio communication unit 116, the piece of divided delivery data that has not been received (step S5008).

When the receiving of the piece of divided delivery data that has not been received is completed ("YES" in step S5009), the delivery data obtaining unit 113 stores the piece of received divided delivery data in the delivery data storage unit 114 (step S5010). The delivery data obtaining unit 113 also updates the data map information recorded in the data map information database 113B (step S5011). Specifically, the delivery data obtaining unit 113 changes the flag of a block corresponding to the piece of received divided delivery data in such a manner as to indicate that the terminal apparatus 110 has received the piece of divided delivery data. The delivery data obtaining unit 113 shifts to the server process to check whether a piece of divided delivery data transmittable to a neighboring terminal apparatus 110 is present (step S5012). As described above, when a piece of divided delivery data transmittable to a neighboring terminal apparatus 110 is not present ("NO" in step S4004) and the terminal apparatus 110 has received all of the pieces of divided delivery data ("YES" in step S4008), the terminal apparatus 110, which has shifted to the server process, ends the processing sequence for obtaining delivery data started in step S3001 (step S4009).

As can be appreciated from the descriptions above, in the radio access system. 1 in accordance with an embodiment, the congestion suppressing apparatus 60 controls data delivery in a manner such that the cloud server 20 delivers delivery data 11A to a representative server terminal apparatus within a terminal apparatus group. The radio access system 1 in accordance with an embodiment is configured in a manner such that delivery data 11A is delivered from a representative server terminal apparatus that has received delivery data 11A to each terminal apparatus 110 through communications between the terminal apparatuses 110 within a terminal apparatus group.

Therefore, according to a radio access system in accordance with an embodiment, the minimal necessary bandwidth to deliver data to a representative server terminal apparatus may be a sufficient bandwidth needed for the radio-access-network side, including abase station apparatus, to deliver data to terminal apparatuses 110 geographically concentrated in a particular area. A radio access system in accordance with an embodiment may prevent requests to enable communications with a plurality of geographically concentrated terminal apparatuses from being concentrated on a particular communications infrastructure within a radio access network, thereby preventing congestion in the particular communications infrastructure.

Mere examples of radio access systems in accordance with embodiments have been described, and it should be noted that various changes can be made to the radio access systems described above.

For example, the congestion suppressing apparatus 60 may be connected to the core network 50 without the intervention of the Internet network 40. The congestion suppressing apparatus 60 may be integrated with another element within the radio access network, e.g., the cloud server 20 or the position information managing apparatus 30.

The processes above performed by elements of the congestion suppressing apparatus 60 may be managed in a software-based instruction format such as a congestion suppression program, and the congestion suppression program may cause a computer to perform various processes. In one possible example, the congestion suppression program is recorded in a recording medium and is stored in the storage 60A-3 via the storage medium drive 60A-4. The CPU 60A-1 loads the stored congestion suppression program into the memory 60A-2 and executes this program.

In addition, the processes above performed by elements of the terminal apparatus 110 may be managed in a software-based instruction format such as a delivery-data obtainment program, and the delivery-data obtainment program may cause a computer to perform various processes. In one possible example, the delivery-data obtainment program is recorded in a recording medium and is stored in the storage 110A-3 via the storage medium drive 110A-4. The CPU 110A-1 loads the delivery-data obtainment program into the memory 110A-2 and executes this program.

The aforementioned advantages may be obtained even when the changes described above are made to the radio access system in accordance with any of the embodiments.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio access system comprising:
   a controlling apparatus configured to
      receive position information transmitted from terminal apparatuses,
      store the received position information,
      obtain, from among the stored position information, position information of destination terminal apparatuses to which delivery data is to be delivered,
      when the destination terminal apparatuses are judged to be concentrated in a particular area in accordance with the obtained position information, group the destination terminal apparatuses present in the particular area together as a terminal apparatus group,
select a representative server terminal apparatus from the terminal apparatuses included in the terminal apparatus group,
transmit group information related to the terminal apparatuses included in the terminal apparatus group to each of the terminal apparatuses included in the terminal apparatus group,
divide the delivery data into a plurality of pieces of divided delivery data in accordance with a number of the terminal apparatuses included in the terminal apparatus group and a data size of the delivery data,
create data map information indicating a delivery rule for delivering the delivery data from the representative server terminal apparatus to another terminal apparatus within the terminal apparatus group by assigning an address to each of the plurality of pieces of divided delivery data,
add information for identification of the representative server terminal apparatus to the created data map information, and transmit the data map information to each of the terminal apparatuses included in the terminal apparatus group, and
instruct a delivery data server to deliver the delivery data to the representative server terminal apparatus; and
a terminal apparatus configured to
transmit the position information of the terminal apparatus to the controlling apparatus,
receive the group information and data map information transmitted from the controlling apparatus, and
obtain the delivery data that the representative server terminal apparatus has obtained from the delivery data server, by communicating, in accordance with the received data map information, with the another terminal apparatus within the terminal apparatus group included in the received group information, wherein
the terminal apparatus transmits, to the another terminal apparatus within the terminal apparatus group, the address of a piece of divided delivery data that has not been obtained from among the plurality of pieces of divided delivery data, and obtains the delivery data by receiving the piece of transmitted divided delivery data corresponding to the address from the another terminal apparatus.

2. The radio access system according to claim 1, wherein using a number of the delivery destination terminal apparatuses present in the particular area, a processing capacity of a base station apparatus that covers communications of the delivery destination terminal apparatuses present in the particular area, and a requested delivery rate of the delivery data, the controlling apparatus selects a number of the terminal apparatus groups and selects terminal apparatuses to be included in each of the terminal apparatus groups.

3. The radio access system according to claim 1, wherein the controlling apparatus uses model information of each of the terminal apparatuses included in the terminal apparatus group so as to select, from the terminal apparatuses included in the terminal apparatus group, a terminal apparatus of a model for a high-speed communication as the representative server terminal apparatus.

4. The radio access system according to claim 1, wherein the controlling apparatus uses power information of each of the terminal apparatuses included in the terminal apparatus group so as to select, from the terminal apparatuses included in the terminal apparatus group, a terminal apparatus whose battery is not easily drained as the representative server terminal apparatus.

5. The radio access system according to claim 1, wherein the controlling apparatus samples position information of each of the terminal apparatuses included in the terminal apparatus group at certain time intervals, and selects a terminal apparatus that moves a short distance from the terminal apparatuses included in the terminal apparatus group as the representative server terminal apparatus.

6. The radio access according to claim 1, wherein the controlling apparatus selects a number of the representative server terminal apparatuses for the terminal apparatus group in accordance with a scale of the terminal apparatus group and a requested delivery rate of the delivery data.

7. The radio access system according to claim 1, wherein the controlling apparatus obtains a bandwidth use situation of a base station apparatus that covers a communication area of the destination terminal apparatuses present in the particular area, and selects a number of representative server terminal apparatuses for the terminal apparatus group in accordance with the obtained bandwidth use situation and a scale of the terminal apparatus group.

8. A controlling apparatus comprising:
a position information managing unit configured to receive and store position information transmitted from a terminal apparatus;
a grouping unit configured to
obtain, from the position information managing unit, position information of destination terminal apparatuses to which delivery data is to be delivered,
when the destination terminal apparatuses are judged to be concentrated in a particular area in accordance with the obtained position information, group the destination terminal apparatuses present in the particular area together as a terminal apparatus group,
select a representative server terminal apparatus from the terminal apparatuses included in the terminal apparatus group, and
transmit group information related to the terminal apparatuses included in the terminal apparatus group to each of the terminal apparatuses included in the terminal apparatus group; and
a data mapping unit configured to
divide the delivery data into a plurality of pieces of divided delivery data in accordance with a number of the terminal apparatuses included in the terminal apparatus group and a data size of the delivery data,
create data map information indicating a delivery rule for delivering the delivery data from the representative server terminal apparatus to another terminal apparatus within the terminal apparatus group by assigning an address to each of the plurality of pieces of divided delivery data,
add information for identification of the representative server terminal apparatus to the created data map information, and transmit the data map information to each of the terminal apparatuses included in the terminal apparatus group, and
instruct a delivery data server to deliver the delivery data to the representative server terminal apparatus.

9. A terminal apparatus comprising:
a terminal information transmitting unit configured to transmit position information of the terminal apparatus to a controlling apparatus;
a delivery information receiving unit configured to when destination terminal apparatuses to which delivery data is to be delivered are judged to be concentrated in a particular area in accordance with the transmitted position information and position information of another terminal apparatus, receive, from the controlling apparatus, group information related to a plurality of terminal apparatuses included in a terminal apparatus group to which the destination terminal apparatuses present in the particular area belong, and receive data map information to which information for identification of a representative server terminal apparatus selected from the plurality of terminal apparatuses included in the terminal apparatus group has been added, the data map information indicating a delivery rule for delivering the delivery data from the representative server terminal apparatus to another terminal apparatus within the terminal apparatus group, the data map information being created by assigning an address to each of a plurality of pieces of divided delivery data which is obtained by dividing the delivery data in accordance with a number of the terminal apparatuses included in the terminal apparatus group and a data size of the delivery data; and a delivery data obtaining unit configured to obtain the delivery data that the representative server terminal apparatus has obtained from the delivery data server, by communicating, in accordance with the data map information received by the delivery information receiving unit, with the another terminal apparatus within the terminal apparatus group included in the group information received by the delivery information receiving unit, wherein the delivery data obtaining unit transmits, to the another terminal apparatus within the terminal apparatus group, the address of a piece of divided delivery data that has not been obtained from among the plurality of pieces of divided delivery data, and obtains the delivery data by receiving the piece of transmitted divided delivery data corresponding to the address from the another terminal apparatus.

* * * * *